US010923742B2

(12) United States Patent
Minamiura et al.

(10) Patent No.: US 10,923,742 B2
(45) Date of Patent: Feb. 16, 2021

(54) FUEL CELL AND METHOD FOR MANUFACTURING FUEL CELL

(71) Applicant: Panasonic Intellectual Property Management Co., Ltd., Osaka (JP)

(72) Inventors: Takeshi Minamiura, Osaka (JP); Takashi Yasuo, Hyogo (JP); Tsutomu Kawashima, Nara (JP); Hiroaki Suzuki, Osaka (JP); Miyuki Yoshimoto, Osaka (JP); Shinichiro Imura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 412 days.

(21) Appl. No.: 15/697,448

(22) Filed: Sep. 7, 2017

(65) Prior Publication Data

US 2017/0373329 A1    Dec. 28, 2017

Related U.S. Application Data

(63) Continuation of application No. PCT/JP2016/001041, filed on Feb. 26, 2016.

(30) Foreign Application Priority Data

Mar. 30, 2015  (JP) .............................. JP2015-068846
Mar. 30, 2015  (JP) .............................. JP2015-068847

(51) Int. Cl.
*H01M 8/0273*    (2016.01)
*H01M 8/0239*    (2016.01)
(Continued)

(52) U.S. Cl.
CPC ....... *H01M 8/0273* (2013.01); *H01M 4/8605* (2013.01); *H01M 8/0239* (2013.01);
(Continued)

(58) Field of Classification Search
CPC .. H01M 4/8807; H01M 8/026; H01M 8/0243; H01M 8/0239; H01M 8/0234;
(Continued)

(56) References Cited

U.S. PATENT DOCUMENTS

2003/0175575 A1    9/2003  Zuber et al.
2004/0258974 A1*  12/2004  Tsuji ................... H01M 8/0247
                                                                        429/456
(Continued)

FOREIGN PATENT DOCUMENTS

JP    2002-042838    2/2002
JP    2002-170581    6/2002
(Continued)

OTHER PUBLICATIONS

International Search Report of PCT application No. PCT/JP2016/001041 dated May 31, 2016.

*Primary Examiner* — Milton I Cano
*Assistant Examiner* — Philip A. Stuckey
(74) *Attorney, Agent, or Firm* — McDermott Will and Emery LLP

(57) ABSTRACT

A fuel cell includes a pair of separators for clamping a laminate including a membrane electrode assembly, an anode gas diffusion layer, and a cathode gas diffusion layer, and a frame formed from thermosetting resin and disposed between the separators to surround a periphery of the laminate. At least one of the anode and the cathode gas diffusion layers is formed from a composite of thermoplastic resin and conductive particles, and includes a protrusion protruding beyond a level of a surface of the frame which faces one of the separators in a state that the laminate is not clamped between the separators under a predetermined pressure. The one of the separators presses the protrusion and gets the one of the gas diffusion layers to be deformed and put into contact with the frame in a state that the
(Continued)

laminate is clamped between the separators under the predetermined pressure.

8 Claims, 14 Drawing Sheets

(51) Int. Cl.
*H01M 8/0247* (2016.01)
*H01M 8/0243* (2016.01)
*H01M 4/86* (2006.01)
*H01M 8/0284* (2016.01)
*H01M 8/0286* (2016.01)
*H01M 8/1004* (2016.01)
*H01M 8/1018* (2016.01)

(52) U.S. Cl.
CPC ....... *H01M 8/0243* (2013.01); *H01M 8/0247* (2013.01); *H01M 8/0284* (2013.01); *H01M 8/0286* (2013.01); *H01M 8/1004* (2013.01); H01M 2008/1095 (2013.01); H01M 2250/20 (2013.01); H01M 2250/30 (2013.01); *Y02E 60/50* (2013.01); *Y02P 70/50* (2015.11)

(58) Field of Classification Search
CPC ......... H01M 2008/1095; H01M 8/023; H01M 8/0273; H01M 8/0247; H01M 4/8605; H01M 8/0286; H01M 8/1004; H01M 2250/20; H01M 2250/30; B29C 59/026; B29K 2105/167; B29K 2995/0005; B29L 2031/3468; B29L 2009/005; Y02P 70/56; Y02P 70/50; Y02E 60/50

See application file for complete search history.

(56) References Cited

U.S. PATENT DOCUMENTS

| | | |
|---|---|---|
| 2008/0230936 A1 | 9/2008 | Takada |
| 2010/0098989 A1 | 4/2010 | Morimoto et al. |
| 2010/0183941 A1 | 7/2010 | Kurita et al. |
| 2011/0136044 A1* | 6/2011 | Han .................. H01M 8/0243 |
| | | 429/518 |
| 2011/0244358 A1 | 10/2011 | Yamauchi et al. |
| 2012/0164553 A1 | 6/2012 | Gemba et al. |
| 2014/0011111 A1* | 1/2014 | Mitsuta ............... H01M 8/0273 |
| | | 429/481 |
| 2017/0162893 A1* | 6/2017 | Tanaka ................. H01M 8/023 |

FOREIGN PATENT DOCUMENTS

| | | |
|---|---|---|
| JP | 2002-324556 | 11/2002 |
| JP | 2003-257469 | 9/2003 |
| JP | 2008-262893 | 10/2008 |
| JP | 2009-218231 | 9/2009 |
| JP | 2011-233537 | 11/2011 |
| JP | 2014-120249 | 6/2014 |
| WO | 2008/153147 | 12/2008 |
| WO | 2011/027550 | 3/2011 |

* cited by examiner

FUEL CELL AND METHOD FOR MANUFACTURING FUEL CELL

RELATED APPLICATIONS

This application is a Continuation of the PCT International Application No. PCT/JP2016/001041, filed on Feb. 26, 2016, which claims the benefit of foreign priority of Japanese Application No. 2015-068846, filed on Mar. 30, 2015 and Japanese Application No. 2015-068847, filed on Mar. 30, 2015, the contents all of which applications are incorporated herein by reference.

BACKGROUND

1. Technical Field

The present disclosure relates to a fuel cell and a method for manufacturing a fuel cell.

2. Description of the Related Art

A fuel cell is a device that generates electric energy from hydrogen and oxygen, and can achieve a high power generation efficiency. Since a fuel cell directly generates power from chemical energy without going through thermal or kinetic energy states that are involved in the conventional power generation scheme, the fuel cell has main characteristics such as high power generation efficiency with a small size, and less influence on the environment due to less emission of nitrogen compound and other harmful substances, less noise and less vibration. As described above, a fuel cell achieves the effective use of the chemical energy of fuel and has the environmentally friendly characteristic, and thus is expected as an energy supplying system for the twenty-first century. For this reason, a fuel cell has been attracting attention as a promising novel power generation system for use in space, an automobile, and a mobile instrument, and for various kinds of usages ranging from large-scale power generation to small-scale power generation. Accordingly, the technological development of the fuel cell has been fully in progress for practical use.

Unexamined Japanese Patent Publication No. 2002-42838 discloses a fuel cell having a structure clamped between a pair of separators in which the structure is formed of an anode, an electrolyte film, and a cathode stacked in sequence. In the fuel cell, a sealing component is provided so as to surround a perimeter of the structure. The sealing component has protrusions that protrude toward the separators before the structure is clamped between the separators. The pair of separators clamp the structure such that the protrusions of the sealing component are pressed by the separators and elastically deformed. This configuration enables the fuel cell of Unexamined Japanese Patent Publication No. 2002-42838 to prevent gas leakage at ends of the structure.

Unexamined Japanese Patent Publication No. 2009-218231 discloses a fuel cell formed of stacked cell modules in which each cell module includes a polymer electrolyte film, electrode layers stacked on both surfaces of the polymer electrolyte film, and a pair of separators for clamping the electrode layers. In the fuel cell, a periphery of the electrolyte film is clamped by a frame. The frame has a structure of pits and projections successively arranged along the periphery of the electrolyte film. The pits and projections of the frame are disposed so as to oppose each other across the electrolyte film. An elastic member is disposed on the pits of the frame. In the fuel cell of Unexamined Japanese Patent Publication No. 2009-218231, a gap between the frame and the electrode layers is filled with the elastic member disposed on the pits of the frame and thus gas sealing performance is secured.

SUMMARY

A fuel cell according to a first aspect of the present disclosure includes a membrane electrode assembly, an anode gas diffusion layer, a cathode gas diffusion layer, a pair of separators, and a frame. The membrane electrode assembly includes an electrolyte film having a first surface and a second surface disposed at a side opposite to the first surface, an anode catalyst layer disposed so as to face the first surface of the electrolyte film, and a cathode catalyst layer disposed so as to face the second surface of the electrolyte film. The anode gas diffusion layer is disposed on the anode catalyst layer at a side opposite to the electrolyte film. The cathode gas diffusion layer is disposed on the cathode catalyst layer at a side opposite to the electrolyte film. The pair of separators are disposed on the anode gas diffusion layer at a side opposite to the membrane electrode assembly and on the cathode gas diffusion layer at a side opposite to the membrane electrode assembly, respectively, the pair of separators being configured to clamp a laminate that includes the membrane electrode assembly, the anode gas diffusion layer, and the cathode gas diffusion layer. The frame is disposed between the pair of separators and surrounds a periphery of the laminate. At least one gas diffusion layer of the anode gas diffusion layer and the cathode gas diffusion layer has lower stiffness than stiffness of the frame, and has a protrusion protruding beyond a level of a surface of the frame which faces one of the separators in a state that the laminate is not clamped between the pair of separators under a predetermined pressure. The one of the separators presses the protrusion and gets the at least one of the gas diffusion layers to be deformed and put into contact with the frame in a state that the laminate is clamped between the separators under a predetermined pressure.

According to the first aspect, degradation in gas sealing performance of the fuel cell due to a reduction in thickness can be suppressed.

In a method for manufacturing a fuel cell, according to a second aspect of the present disclosure, an anode gas diffusion layer and a cathode gas diffusion layer are each formed by rolling a composite of conductive particles and thermoplastic resin such that a degree of elasticity is higher in a first direction than in a second direction, the first direction being parallel to a main surface of the gas diffusion layer, the second direction being parallel to the main surface and intersecting with the first direction. Then, a fuel gas fluid flow path for flowing fuel gas which is to be supplied to the anode gas diffusion layer is provided such that the fuel gas fluid flow path extends parallel to the second direction of the anode gas diffusion layer. An oxidant gas fluid flow path for flowing oxidant gas which is to be supplied to the cathode gas diffusion layer is provided such that the oxidant gas fluid flow path extends parallel to the second direction of the cathode gas diffusion layer. The method further involves preparing a membrane electrode assembly including; an electrolyte film having a first surface and a second surface disposed at a side opposite to the first surface; an anode catalyst layer disposed so as to face the first surface of the electrolyte film; and a cathode catalyst layer disposed so as to face the second surface of the electrolyte film. A laminate is then formed by disposing a frame such that the frame surrounds a periphery of the membrane electrode assembly, and by at least one of disposing the anode gas diffusion layer on the anode catalyst layer at a side opposite to the electrolyte film such that a protrusion protruding beyond a level of an outer surface of the frame is formed on the anode gas diffusion layer and disposing the cathode gas diffusion layer on the cathode catalyst layer at a side opposite to the electrolyte film such that a protrusion protruding beyond a level of an outer surface of the frame is formed on cathode gas diffusion layer. The method further involves disposing one of a pair of separators on the anode gas diffusion layer at a side opposite to the membrane electrode assembly and the other of the pair of separators on the cathode gas diffusion layer at a side opposite to the membrane electrode assembly, and deforming at least one of the anode gas diffusion layer and cathode gas diffusion layer to put into contact with the frame by applying a predetermined pressure to the pair of separators so that the pair of separators clamp the laminate, and press the protrusion.

The method according to the second aspect of the present disclosure allows the forming of a fuel cell having a simplified gas sealing structure.

DETAILED DESCRIPTION OF EMBODIMENT

Prior to describing exemplary embodiments of the present disclosure, problems found in the conventional art will now be briefly described.

In recent years, further slimming down of fuel cells has been required. The inventors of the present disclosure have extensively studied to reduce the thickness of fuel cells and found that a gas sealing structure in the fuel cell of Unexamined Japanese Patent Publication No. 2002-42838 may not prevent the gas sealing performance of the fuel cell from degrading if the fuel cell comes down in thickness.

As described above, the fuel cell of Unexamined Japanese Patent Publication No. 2009-218231 includes a structure in which pits and projections are formed on the frame and an elastic member is disposed on the pits to provide gas sealing. Thus, the fuel cell of Unexamined Japanese Patent Publication No. 2009-218231 has such a complicated gas sealing structure.

The present disclosure, accomplished in view of the above disadvantages, provides a technique for suppressing degradation in gas sealing performance of a fuel cell due to a reduction in thickness. The present disclosure also provides a technique for simplifying a gas sealing structure of a fuel cell.

Exemplary embodiments of the present disclosure will now be described with reference to the accompanying drawings. In all diagrams, any identical components are denoted by an identical reference sign, and any duplicate description thereof will be omitted as appropriate. The exemplary embodiments are not intended to limit the disclosure but are merely exemplary, and all characteristics and any combination thereof described in the exemplary embodiments do not necessarily represent essential elements of the disclosure.

First Exemplary Embodiment

Figure 1:
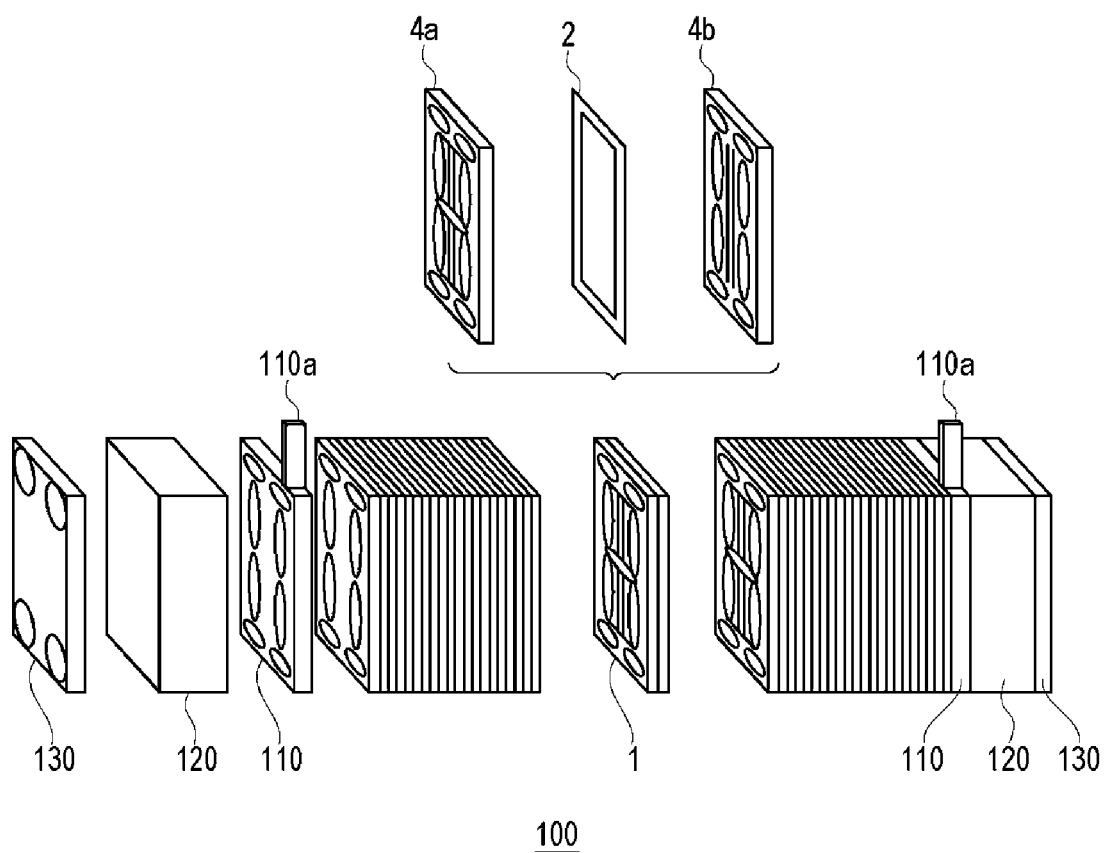
FIG. 1 is an exploded perspective view schematically illustrating a fuel cell stack structure including a fuel cell according to a first exemplary embodiment.

FIG. 1 is an exploded perspective view schematically illustrating a fuel cell stack structure including a fuel cell according to a first exemplary embodiment. Fuel cell stack 100 has a structure including a plurality of stacked fuel cells 1 according to the present exemplary embodiment. A gasket (not illustrated) is provided between adjacent fuel cells 1. Current collector 110, insulating plate 120, and fastening plate 130 are disposed in sequence on each side of fuel cell stack 100 in a stack direction of fuel cell 1. A predetermined load is put on fastening plates 130 from both sides in the stack direction such that stacked fuel cells 1 are fastened to each other and fuel cell stack 100 is formed.

Terminal 110a for electric current extraction is provided on each current collector 110. When fuel cell 1 generates electricity, electric current is extracted from terminal 110a. Each insulating plate 120 insulates fastening plate 130 from current collector 110. Insulating plate 120 and fastening plate 130 may be provided with gas or coolant inlet and outlet (not illustrated). A predetermined external load is put on each fastening plate 130. Stacked fuel cells 1, a pair of current collectors 110, and a pair of insulating plates 120 are put between a pair of fastening plates 130, and an assembly of these elements is pressurized by a fastener (not illustrated) in the lamination direction and fastened to each other. Insulating plate 120 and fastening plate 130 may be integrated and molded from an insulating material. Fuel cell 1 has a structure in which laminate 2 is put between separators 4a, 4b. The structure of fuel cell 1 will now be described in detail.

Figure 2A:
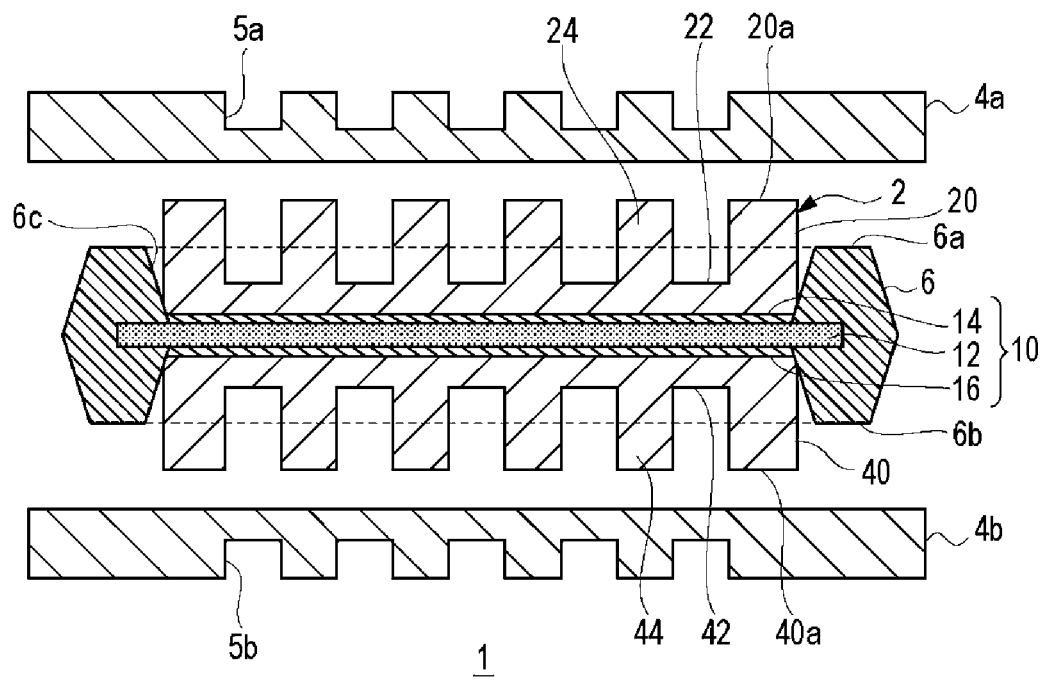
FIG. 2A is a cross-sectional view schematically illustrating a structure of the fuel cell according to the first exemplary embodiment.
Figure 2B:
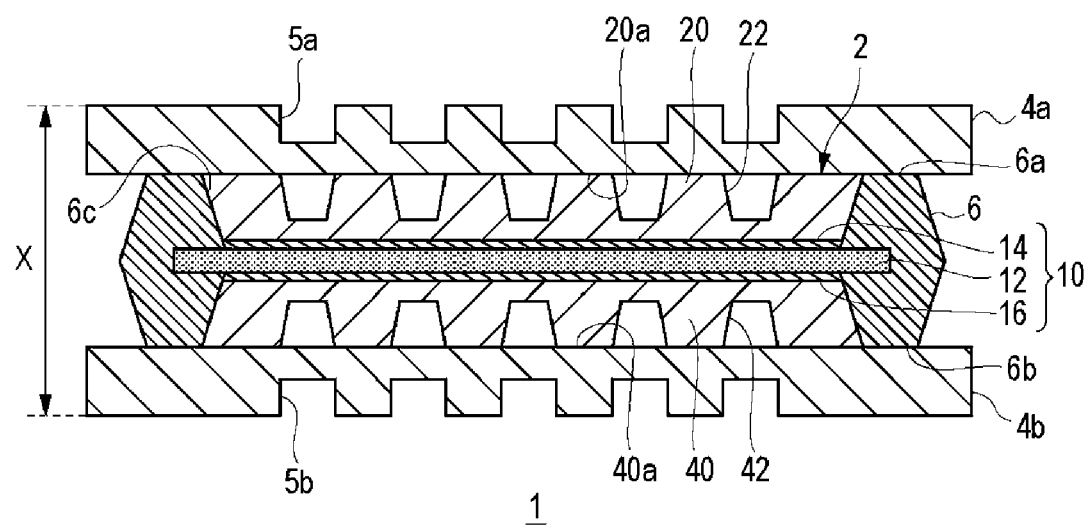
FIG. 2B is another cross-sectional view schematically illustrating a structure of the fuel cell according to the first exemplary embodiment.

FIGS. 2A and 2B are each a schematic cross-sectional view of a fuel cell according to the first exemplary embodiment. FIG. 2A illustrates laminate 2 before laminate 2 is clamped between separators 4a, 4b, whereas FIG. 2B illustrates laminate 2 clamped between separators 4a, 4b. Fuel cell 1 includes laminate 2, separators 4a, 4b, and frame 6.

Laminate 2 includes membrane electrode assembly 10, anode gas diffusion layer 20, and cathode gas diffusion layer 40. Membrane electrode assembly 10 is shaped in a substantially flat plate. Anode gas diffusion layer 20 and cathode gas diffusion layer 40 are provided such that main surfaces of anode gas diffusion layer 20 and cathode gas diffusion layer 40 oppose each other across membrane electrode assembly 10. Separator 4a is stacked on anode gas diffusion layer 20 at a side opposite to membrane electrode assembly 10. Separator 4b is stacked on cathode gas diffusion layer 40 at a side opposite to membrane electrode assembly 10.

Membrane electrode assembly 10 includes electrolyte film 12, anode catalyst layer 14 disposed so as to face one of main surfaces (a first surface) of electrolyte film 12, and cathode catalyst layer 16 disposed so as to face the other main surface (a second surface) of electrolyte film 12.

Electrolyte film 12 has good ion conductivity in a wet state, and serves as an ion exchange membrane that allows protons to move between anode catalyst layer 14 and cathode catalyst layer 16. Electrolyte film 12 is formed of a solid polymer material such as fluorine-containing polymer or non-fluorine polymer. Examples of the material of electrolyte film 12 include sulfonic acid type perfluorocarbon polymer, polysulfone resin, and perfluorocarbon polymer including phosphonate group or carboxylic acid group. Examples of sulfonic acid type perfluorocarbon polymer includes Nafion (manufactured by Du Pont; registered trademark) 112. Examples of non-fluorine polymer include sulfonated aromatic polyether ether ketone and polysulfone. Electrolyte film 12 has a thickness of, for example, 10 μm to 200 μm, inclusive.

Anode catalyst layer 14 and cathode catalyst layer 16 each include ion exchange resin and catalyst particles, and in some cases include carbon particles that support catalyst particles. The ion exchange resin included in anode catalyst layer 14 and cathode catalyst layer 16 connects the catalyst particles and electrolyte film 12 to transfer a proton between the catalyst particles and electrolyte film 12. The ion exchange resin may be formed of a polymer material similar to the polymer material of electrolyte film 12. Examples of the catalyst particles include catalyst metals such as alloys or singles selected from the group consisting of Sc, Y, Ti, Zr, V, Nb, Fe, Co, Ni, Ru, Rh, Pd, Pt, Os, Ir, lanthanoid series elements, and actinoid series elements. The carbon particles may be, for example, acetylene black, Ketjen black, or carbon nanotube. Anode catalyst layer 14 and cathode catalyst layer 16 each have a thickness of, for example, 10 μm to 40 μm, inclusive.

Anode gas diffusion layer 20 is disposed on anode catalyst layer 14 at a side opposite to electrolyte film 12. Anode gas diffusion layer 20 is formed from a composite of a thermoplastic resin and conductive particles. The thermoplastic resin functions as a binder for binding conductive particles. Thus, anode gas diffusion layer 20 has a structure in which the conductive particles are incorporated into a network formed from the thermoplastic resin. As a result, anode gas diffusion layer 20 is conductive and includes a large number of fine voids. Anode gas diffusion layer 20 also has elasticity. Anode gas diffusion layer 20 that is not pressed by separators 4a, 4b has a thickness of, for example, 250 μm to 600 μm, inclusive. Anode gas diffusion layer 20 that is pressed by separators 4a, 4b has a thickness of, for example, 200 μm to 500 μm, inclusive.

Examples of the conductive particles include carbon particles of carbon black, artificial graphite, natural graphite, or expanded graphite, or metal particles. The conductive particles each have an average particle diameter of, for example, 0.01 μm to 50 μm, inclusive for primary particles. Examples of the thermoplastic resin include fluorine resin such as polytetrafluoro ethylene (PTFE), tetrafluoro ethylene-perfluoro alkyl vinyl ether copolymer (PFA), tetrafluoro ethylene-hexafluoropropylene copolymer (FEP), or (tetrafluoro ethylene-ethylene copolymer (ETFE).

Anode gas diffusion layer 20 is primarily composed of the conductive particles and the thermoplastic resin. Preferably, anode gas diffusion layer 20 should contain 30 mass percent or less of conductive fibers each having a length of 30 μm or shorter. A content of the contained conductive fibers is less than a total content of the conductive particles and the thermoplastic resin, for example. Conductive fibers contained in anode gas diffusion layer 20 improve stiffness, conductivity, and gas diffusibility of anode gas diffusion layer 20. The conductive fibers may be, for example, carbon fibers such as polyacrylonitrile carbon fibers, rayon carbon fibers, pitch carbon fibers, carbon nanotubes, or vapor grown carbon fibers (VGCFs), metal fibers, or any metal-carbon composite such as carbon-coated metal fibers.

The length of each conductive fiber is measured as follows. That is, anode gas diffusion layer 20 is cut to form a cross-section. This cross-section is polished, and then an image of the cross-section is captured by a scanning electron microscope (SEM). The length of the conductive fibers is measured based on the obtained cross-sectional image. Another measuring method is performed as follows. That is, a part of anode gas diffusion layer 20 is cut out and put into a solvent that dissolves thermoplastic resin. This process dissolves the thermoplastic resin contained in anode gas diffusion layer 20. Then, the conductive fibers separated from each other are recovered from the solvent through the well-known operation such as filtration. For example, 400 of the separated conductive fibers are randomly extracted, and the length of each conductive fiber is measured by using an optical microscope or a SEM. The conductive fibers may be separated by a method without a solvent that dissolves thermoplastic resin. In this method, the part of anode gas diffusion layer 20 thus cut out is heated, for example, at a temperature of 500° C. for 30 minutes. With this method, the thermoplastic resin is burned off and the conductive fibers are separated.

Anode gas diffusion layer 20 has groove-shaped fluid flow paths 22 on main surface 20a that faces separator 4a. Fluid flow paths 22 are recesses provided on main surface 20a of anode gas diffusion layer 20. Fluid flow paths 22 are disposed so as to face separator 4a, and serve as flow paths for fuel gas. Fuel gas such as hydrogen gas is distributed to fluid flow paths 22 through a fuel supply manifold (not illustrated), and is supplied from fluid flow paths 22 to anode catalyst layer 14 of membrane electrode assembly 10 through anode gas diffusion layer 20. Fluid flow paths 22 each have, for example, a depth of 30 μm to 450 μm, inclusive, and a width of 100 μm to 1000 μm, inclusive. A distance between adjacent fluid flow paths 22 is from 100 μm to 1000 μm, inclusive. In the present exemplary embodiment, five fluid flow paths 22 are provided, but the number of fluid flow paths 22 is not particularly limited and may be set as appropriate in accordance with, for example, the dimensions of anode gas diffusion layer 20 and fluid flow paths 22. Main surface 20a of anode gas diffusion layer 20 includes at least one portion where no fluid flow path 22 is formed, and the portion comes into contact with separator 4a.

Cathode gas diffusion layer 40 is disposed on cathode catalyst layer 16 at a side opposite to electrolyte film 12. Cathode gas diffusion layer 40 is formed from a composite of thermoplastic resin and conductive particles. Thus, similarly to anode gas diffusion layer 20, cathode gas diffusion layer 40 is conductive and includes a large number of fine voids. Cathode gas diffusion layer 40 also has elasticity. Cathode gas diffusion layer 40 that is not pressed by separators 4a, 4b has a thickness of, for example, 250 μm to 600 μm, inclusive. Cathode gas diffusion layer 40 that is pressed by separators 4a, 4b has a thickness of, for example, 200 μm to 500 μm, inclusive.

Examples of the conductive particles and the thermoplastic resin contained in cathode gas diffusion layer 40 are identical to the examples illustrated for the conductive particles and the thermoplastic resin of anode gas diffusion layer 20. Cathode gas diffusion layer 40 is primarily composed of the conductive particles and the thermoplastic resin. Preferably, cathode gas diffusion layer 40 should contain 30 mass percent or less of conductive fibers each having a length of 30 μm or shorter. A content of the contained conductive fibers is less than a total content of the conductive particles and the thermoplastic resin, for example. Conductive fibers contained in cathode gas diffusion layer 40 improve stiffness, conductivity, and gas diffusibility of cathode gas diffusion layer 40. Examples of the conductive fibers are the same as the examples illustrated for the conductive fibers contained in anode gas diffusion layer 20. Any of the methods described above is used to measure the length of each conductive fiber contained in the layer.

Cathode gas diffusion layer 40 has groove-shaped fluid flow paths 42 on main surface 40a that face separator 4b. Fluid flow paths 42 are recesses provided on main surface 40a of cathode gas diffusion layer 40. Fluid flow paths 42 are disposed so as to face separator 4b, and serve as flow paths for oxidant gas. Oxidant gas such as air is distributed to fluid flow paths 42 through an oxidant supply manifold (not illustrated), and is supplied from fluid flow paths 42 to cathode catalyst layer 16 of membrane electrode assembly 10 through cathode gas diffusion layer 40. Fluid flow paths 42 also serve as drainage paths for water generated in cathode catalyst layer 16. A dimension of each of fluid flow paths 42 and a number of fluid flow paths 42 are similar to the dimension and the number of fluid flow paths 22 of anode gas diffusion layer 20. Main surface 40a of cathode gas diffusion layer 40 includes at least one portion where no fluid flow path 42 is formed, and the portion comes into contact with separator 4b.

Anode gas diffusion layer 20 and cathode gas diffusion layer 40 are each manufactured as follows, for example. That is, a composite of thermoplastic resin and conductive particles is sintered and rolled to be formed into a porous sheet having elasticity. With this process, the thermoplastic resin become fibrillated and the fibrillated thermoplastic resin connects the conductive particles each other. The porous sheet is disposed between a first mold and a second mold wherein the first mold is provided with protrusions corresponding to the shapes of fluid flow paths 22, 42, and the second mold has a flat surface. Subsequently, the first and second molds are closed, and the porous sheet is heated and pressurized at a predetermined temperature and pressure. The temperature and pressure at the molding are, for example, 100° C. to 200° C., and 2 MPa to 3 MPa, respectively. After the elapse of a predetermined period of time, the first and second molds are opened. As a result, anode gas diffusion layer 20 provided with fluid flow paths 22 on main surface 20a is formed. Further, cathode gas diffusion layer 40 provided with fluid flow paths 42 on main surface 40a is formed.

In some cases, a stacked structure of anode catalyst layer 14 and anode gas diffusion layer 20 is referred to as an anode, and a stacked structure of cathode catalyst layer 16 and cathode gas diffusion layer 40 is referred to as a cathode.

Frame 6 is disposed between separators 4a, 4b and surrounds a periphery of laminate 2. Thus, laminate 2 is accommodated in a space defined by separators 4a, 4b and frame 6. According to this exemplary embodiment, frame 6 has a groove formed on surface 6c facing laminate 2, and an end of electrolyte film 12 is inserted into the groove. The end of electrolyte film 12 which is inserted into the groove is a region other than a region that comes into contact with a fuel gas manifold and an oxidant gas manifold (both not illustrated) provided on frame 6. Frame 6 of clamped fuel cell 1 is in contact with side surfaces of anode catalyst layer 14, cathode catalyst layer 16, anode gas diffusion layer 20, and cathode gas diffusion layer 40. These side surfaces join first main surfaces to second main surfaces of the respective layers. These side surfaces are parallel to a direction in which fluid flow paths 22, 42 extend. Only the side surfaces of anode gas diffusion layer 20 and cathode gas diffusion layer 40 may be in contact with frame 6 on condition that the side surface of anode catalyst layer 14 is covered with anode gas diffusion layer 20, and the side surface of cathode catalyst layer 16 is covered with cathode gas diffusion layer 40.

Frame 6 is formed from thermosetting resin. Examples of the thermosetting resin include phenolic resin. Frame 6 has a thickness of, for example, 400 μm to 1100 μm, inclusive.

A first main surface of separator 4a comes into contact with main surface 20a of anode gas diffusion layer 20. Separator 4a has coolant flow paths 5a on a second main surface, i.e. a main surface at a side opposite to laminate 2, in order to cool laminate 2. A first main surface of separator 4b comes into contact with main surface 40a of cathode gas diffusion layer 40. Separator 4b has coolant flow paths 5b on a second main surface, i.e. a main surface at a side opposite to laminate 2, in order to cool laminate 2. Separators 4a, 4b are each formed from a carbon flat board or another flat board made of stainless steel, titanium, or other metal, for example. Separators 4a, 4b each have a thickness of, for example, 100 μm to 300 μm, inclusive.

With reference to FIG. 2A, separators 4a, 4b are disposed such that laminate 2 is interposed between the separators. A predetermined load put on the pair of fastening plates 130 (see FIG. 1) causes separators 4a, 4b to move toward a direction in which separators 4a, 4b get closer to each other. With reference to FIG. 2B, separator 4a presses laminate 2 with a predetermined pressure and stops when separator 4a facing surface 6a of frame 6 comes into contact with surface 6a. Separator 4b presses laminate 2 with a predetermined pressure and stops when separator 4b facing surface 6b of frame 6 comes into contact with surface 6b.

Anode gas diffusion layer 20 includes protrusions 24 that protrude toward separator 4a beyond a level of surface 6a of frame 6 facing separator 4a while a predetermined pressure is not applied from separators 4a, 4b to laminate 2. Cathode gas diffusion layer 40 includes protrusions 44 that protrude toward separator 4b beyond a level of surface 6b of frame 6 facing separator 4b while a predetermined pressure is not applied from separators 4a, 4b to laminate 2.

As described above, anode gas diffusion layer 20 and cathode gas diffusion layer 40 each have a structure in which the conductive particles are incorporated into a network of the thermoplastic resin. Meanwhile, frame 6 is formed from thermosetting resin. Thus, anode gas diffusion layer 20 and cathode gas diffusion layer 40 have stiffness lower than stiffness of frame 6. As a result, a predetermined pressure applied from separators 4a, 4b to laminate 2 causes separator 4a to press protrusions 24 and separator 4b to press protrusions 44. This configuration causes anode gas diffusion layer 20 and cathode gas diffusion layer 40 to be deformed and put into contact with an inner face of frame 6, i.e. surface 6c. In other words, protrusions 24, 44 are pressed by separators 4a, 4b, and anode gas diffusion layer 20 and cathode gas diffusion layer 40 are deformed and put into contact with frame 6, while laminate 2 is clamped between separators 4a, 4b under a predetermined pressure.

Anode gas diffusion layer 20 is deformed such that a part of anode gas diffusion layer 20 near a joint part between separator 4a and frame 6 is deformed to follow a shape of the joint part. Likewise, a part of anode gas diffusion layer 20 near a joint part between frame 6 and electrolyte film 12 is deformed so as to follow the shape of the joint part. Cathode gas diffusion layer 40 is deformed such that a part of cathode gas diffusion layer 40 near a joint part between separator 4b and frame 6 is deformed to follow the shape of the joint part. Likewise, a part of anode gas diffusion layer 20 near a joint part between frame 6 and electrolyte film 12 is deformed so as to follow the shape of the joint part. After laminate 2 is clamped between separators 4a, 4b, that is, anode gas diffusion layer 20 and cathode gas diffusion layer 40 are deformed, total thickness X of laminate 2 and separators 4a, 4b is, for example, from 0.5 mm to 1.5 mm, inclusive.

The thickness of conventional fuel cells is roughly 1 cm to 2 cm. If a fuel cell having a conventional gas sealing structure comes down in thickness, for example, to about one tenth of the conventional thickness, the fuel cell will have difficulty in securing a compression margin (dimension) for a sealing material surrounding the periphery of a laminate of the fuel cell. Consequently, a decrease in thickness of the fuel cell with the conventional gas sealing structure unchanged may cause degradation in gas sealing performance of the fuel cell.

In contrast, anode gas diffusion layer 20 and cathode gas diffusion layer 40 in fuel cell 1 serve as a sealing material. In other words, according to the present exemplary embodiment, frame 6 having high stiffness is provided around the periphery of laminate 2. Further, protrusions 24, 44 are pressed and deformed by separators 4a, 4b. This configuration allows anode gas diffusion layer 20 and cathode gas diffusion layer 40 to be deformed so as to follow the shapes of the joint parts between respective separators 4a, 4b and frame 6, and to come into contact with frame 6. If high-stiffness frame 6 comes into contact with high-stiffness separators 4a, 4b, a gap is likely to appear between the frame and the separators. In this exemplary embodiment, a gap between frame 6 and separators 4a, 4b can be filled by deformation of anode gas diffusion layer 20 and cathode gas diffusion layer 40. This configuration can suppress degradation in the gas sealing performance of a fuel cell even if the fuel cell comes down in thickness.

The stiffness of fuel cells tends to degrade with a reduction in thickness. In order to cope with this, by using frame 6 formed from thermosetting resin, fuel cell 1 can maintain stiffness. Thus, a fuel cell according to the present exemplary embodiment can achieve both stiffness and gas sealing performance.

In solid polymer fuel cell 1 described above, a reaction described below occurs. That is, when hydrogen gas as fuel gas is supplied to anode catalyst layer 14 through anode gas diffusion layer 20, a reaction represented by Expression (1) below occurs in anode catalyst layer 14, and thus hydrogen is decomposed into protons and electrons. The protons move in electrolyte film 12 toward cathode catalyst layer 16. The electrons move to an external circuit (not illustrated) through anode gas diffusion layer 20 and separator 4a, and then flow from the external circuit into cathode catalyst layer 16 through separator 4b and cathode gas diffusion layer 40. When air as oxidant gas is supplied to cathode catalyst layer 16 through cathode gas diffusion layer 40, a reaction represented by Expression (2) below occurs in cathode catalyst layer 16, and oxygen in the air becomes water through reaction with protons and electrons. As a result, electrons flow from the anode toward the cathode through the external circuit, and thus electrical power can be generated.

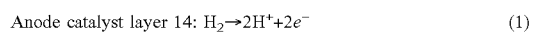

$$\text{Anode catalyst layer 14: } H_2 \rightarrow 2H^+ + 2e^- \qquad (1)$$

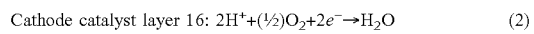

$$\text{Cathode catalyst layer 16: } 2H^+ + (1/2)O_2 + 2e^- \rightarrow H_2O \qquad (2)$$

As described above, fuel cell 1 includes membrane electrode assembly 10, anode gas diffusion layer 20, cathode gas diffusion layer 40, separators 4a, 4b, and frame 6. Frame 6 is formed from thermosetting resin and covers the side surfaces of membrane electrode assembly 10 and the side surfaces of the gas diffusion layers. Anode gas diffusion layer 20 and cathode gas diffusion layer 40 are each formed from a composite of thermoplastic resin and conductive particles. Anode gas diffusion layer 20 and cathode gas diffusion layer 40 include protrusions 24, 44 that protrude beyond the levels of surfaces 6a, 6b, which come into contact with separators 4a, 4b, of frame 6, respectively, while laminate 2 is not clamped between separators 4a, 4b. In a state that laminate 2 is clamped between separators 4a, 4b, protrusions 24, 44 are pressed by separators 4a, 4b, and thus anode gas diffusion layer 20 and cathode gas diffusion layer 40 are deformed and put into contact with surface 6c of frame 6. This configuration can suppress leakage of fuel gas and oxidant gas at an end of laminate 2. As a result, degradation in the gas sealing performance of fuel cell 1 due to a reduction in thickness can be suppressed. Since gas leakage at the end of laminate 2 can be suppressed, the amount of fuel gas and oxidant gas that do not contribute to electrode reaction can be reduced. Thus, degradation in efficiency of fuel cell 1 can be suppressed.

Since anode gas diffusion layer 20 and cathode gas diffusion layer 40 are deformed, the area of contact between anode gas diffusion layer 20 and separator 4a, as well as the area of contact between cathode gas diffusion layer 40 and separator 4b can be secured more certainly compared with another configuration including anode gas diffusion layer 20 and cathode gas diffusion layer 40 formed from carbon paper or other low-elasticity material. Consequently, this configuration can suppress an increase in contact resistance between anode gas diffusion layer 20 and separator 4a, as well as an increase in contact resistance between cathode gas diffusion layer 40 and separator 4b. This configuration also reduces dimensional accuracy required for frame 6 and other components that constitute fuel cell 1. Anode gas diffusion layer 20 and cathode gas diffusion layer 40 can follow to expansion or contraction of membrane electrode assembly 10 caused by heat or generated water.

Anode gas diffusion layer 20 and cathode gas diffusion layer 40 have groove-shaped fluid flow paths 22, 42 on main surfaces 20a, 40a that face separators 4a, 4b, respectively. This configuration can increase the amount of deformation of anode gas diffusion layer 20 and cathode gas diffusion layer 40 when separators 4a, 4b press anode gas diffusion layer 20 and cathode gas diffusion layer 40. As a result, degradation in gas sealing performance of fuel cell 1 can be suppressed with increased reliability.

The scope of the present disclosure is not limited to the exemplary embodiment described above, and includes modifications and variations since those skilled in the art can add various design changes to the exemplary embodiments.

In the exemplary embodiment described above, fuel cell stack 100 includes a plurality of stacked fuel cells 1. However, fuel cell stack 100 may include only one fuel cell 1. In the exemplary embodiment described above, anode gas diffusion layer 20 and cathode gas diffusion layer 40 have respective protrusions 24, 44, and are pressed by separators 4a, 4b and are deformed. However, a configuration of these elements is not particularly limited to the exemplary embodiment. Only one of anode gas diffusion layer 20 and cathode gas diffusion layer 40 may include a protrusion, and may be pressed by a separator and be deformed. In this case, the other gas diffusion layer may be provided with a conventionally-known gas sealing structure.

In the exemplary embodiment described above, anode gas diffusion layer 20 and cathode gas diffusion layer 40 have respective groove-shaped fluid flow paths 22, 42 on their main surfaces 20a, 40a. However, a configuration of these elements is not particularly limited to the exemplary embodiment. Only one of anode gas diffusion layer 20 and cathode gas diffusion layer 40 may have a groove-shaped fluid flow path on its main surface. In this case, the other gas diffusion layer may be provided with a conventionally-known fluid flow path, such as a fluid flow path made up of a groove on a separator. In the exemplary embodiment described above, anode gas diffusion layer 20 and cathode gas diffusion layer 40 each contain conductive fibers. However, a configuration of these elements is not particularly limited to the exemplary embodiment. Only one of anode gas diffusion layer 20 and cathode gas diffusion layer 40 may contain conductive fibers.

Second Exemplary Embodiment

Figure 3:
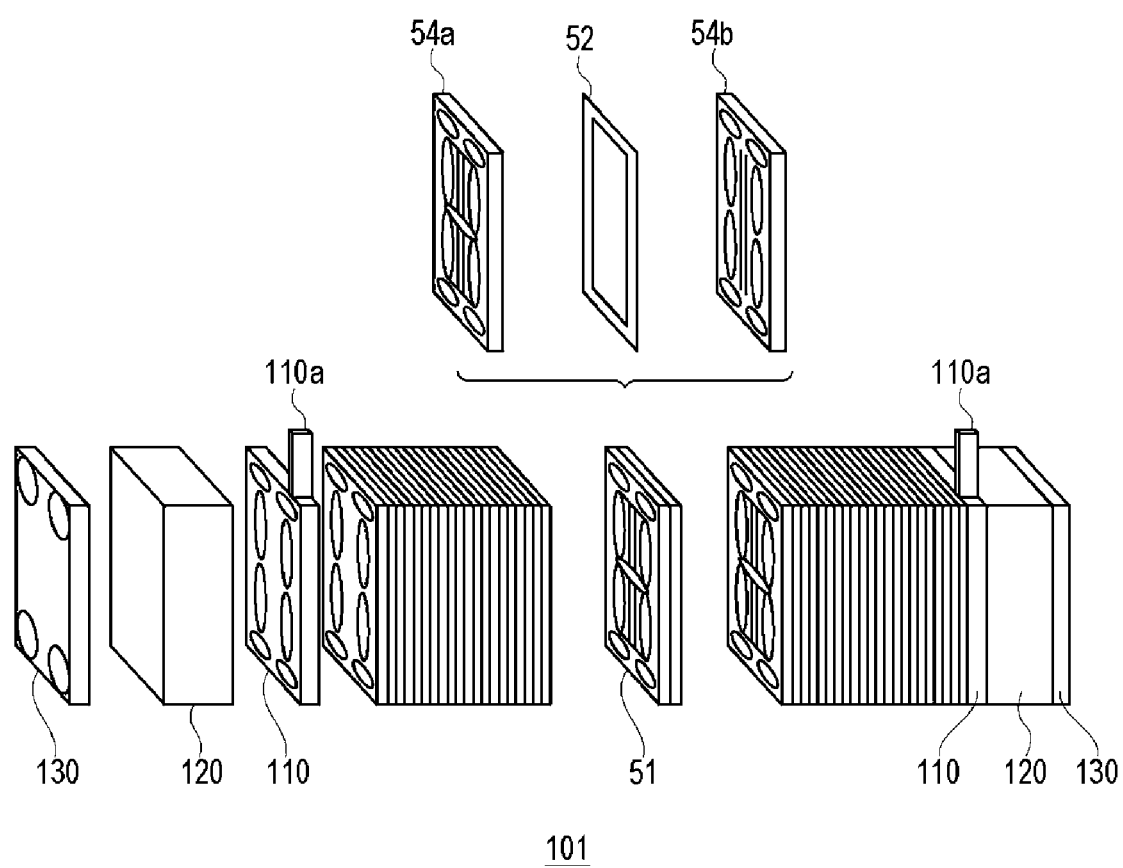
FIG. 3 is an exploded perspective view schematically illustrating a fuel cell stack structure including a fuel cell according to a second exemplary embodiment.

FIG. 3 is an exploded perspective view schematically illustrating a fuel cell stack structure including a fuel cell according to a second exemplary embodiment. Fuel cell stack 101 has a structure including a plurality of stacked fuel cells 51 according to the present exemplary embodiment. Fuel cell 51 has a structure in which laminate 52 is put between separators 54a, 54b. The rest of the fuel cell stack 101 configuration is similar to the configuration of fuel cell stack 100 according to the first exemplary embodiment. The structure of fuel cell 51 will now be described in detail.

Figure 4:
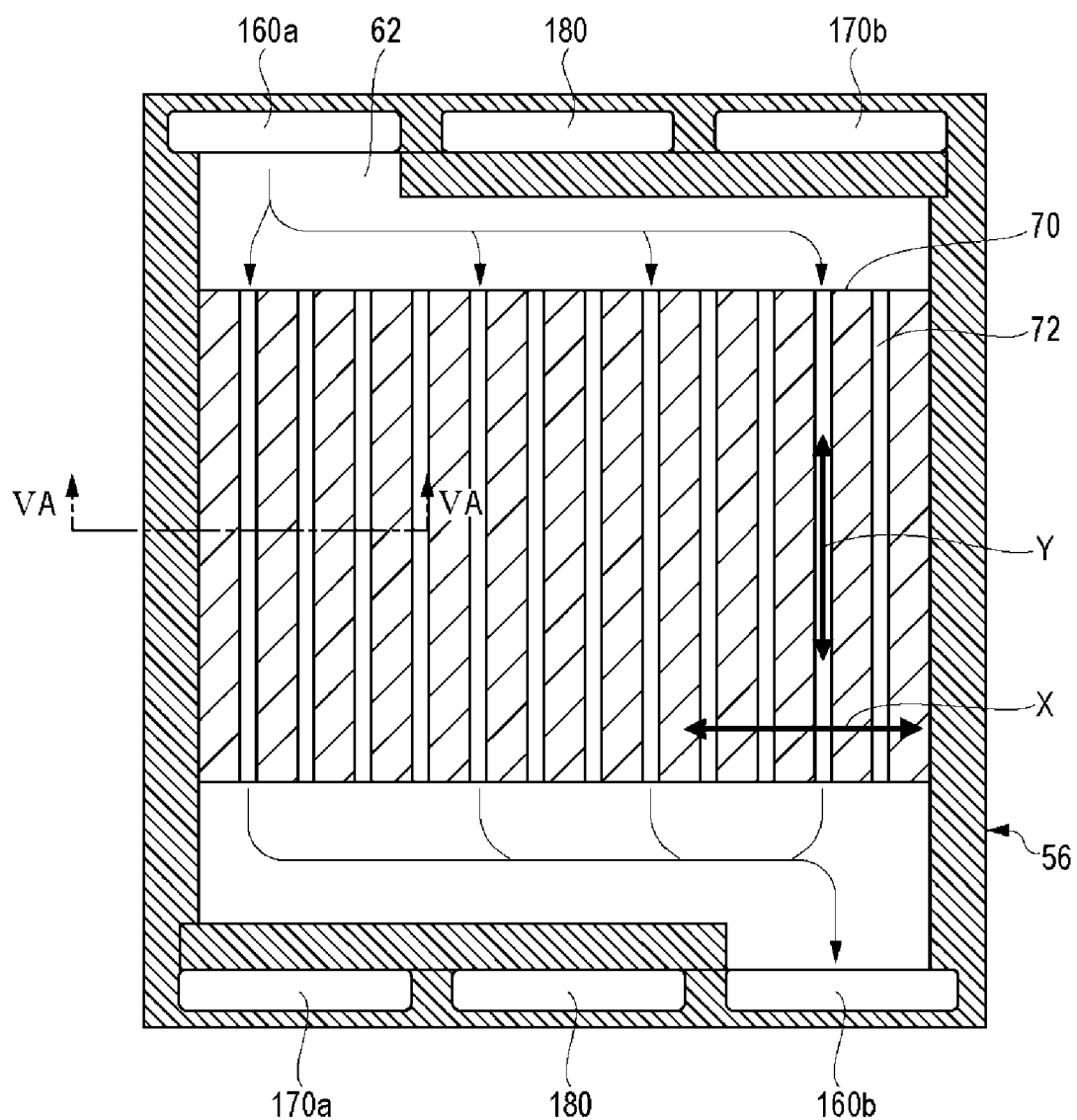
FIG. 4 is a plan view schematically illustrating a structure of the fuel cell according to the second exemplary embodiment.
Figure 5A:
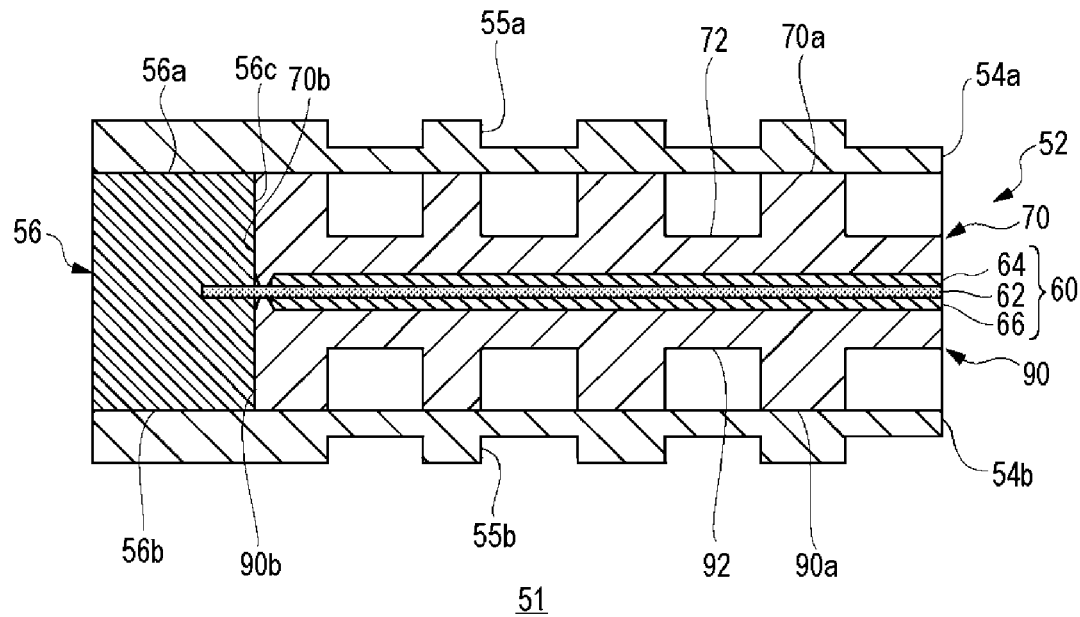
FIG. 5A is a cross-sectional view taken along line VA-VA of FIG. 4.
Figure 5B:
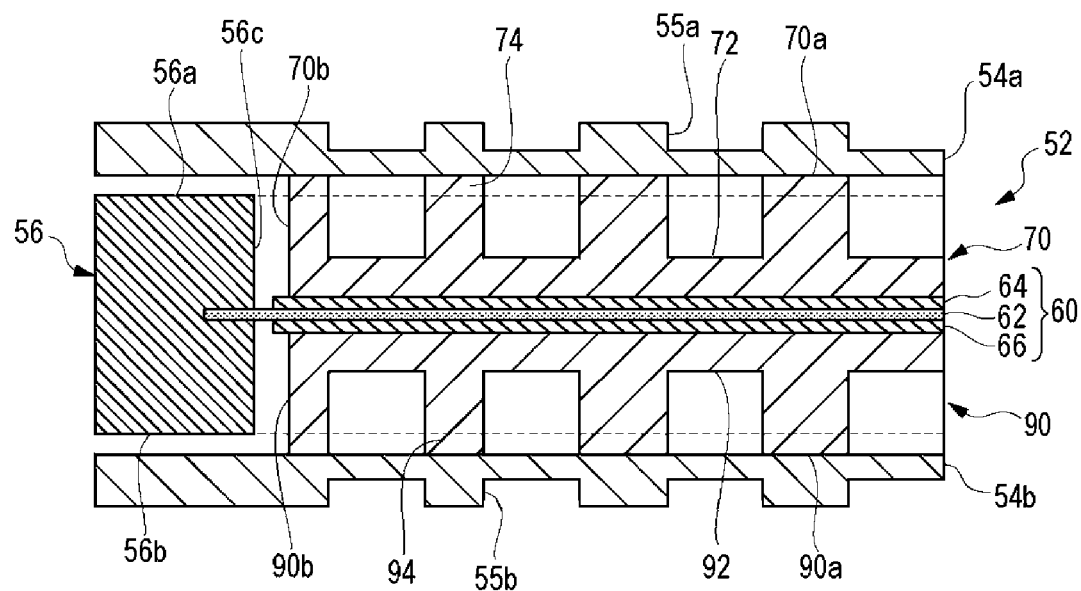
FIG. 5B is a cross-sectional view illustrating a laminate of FIG. 5A before the laminate is clamped between a pair of separators.

FIG. 4 is a schematic plan view of fuel cell 51. FIG. 5A is a cross-sectional view taken along line VA-VA of FIG. 4. FIG. 4 illustrates laminate 52 clamped between separators 54a, 54b, but separators 54a, 54b are omitted for the sake of describing the interior structure of fuel cell 51. FIG. 4 illustrates one example of a surface on which anode gas diffusion layer 70 is provided. FIG. 5A illustrates laminate 52 clamped between separators 54a, 54b, whereas FIG. 5B illustrates laminate 52 before laminate 52 is clamped between separators 54a, 54b.

Fuel cell 51 includes laminate 52, separators 54a, 54b, and frame 56. Laminate 52 includes membrane electrode assembly 60, anode gas diffusion layer 70, and cathode gas diffusion layer 90. Membrane electrode assembly 60 is shaped in a substantially flat plate. Anode gas diffusion layer 70 and cathode gas diffusion layer 90 are provided such that main surfaces of anode gas diffusion layer 70 and cathode gas diffusion layer 90 oppose each other across membrane electrode assembly 60. Separator 54a is stacked on anode gas diffusion layer 70 at a side opposite to membrane electrode assembly 60. Separator 54b is stacked on cathode gas diffusion layer 90 at a side opposite to membrane electrode assembly 60.

Membrane electrode assembly 60 includes electrolyte film 62, anode catalyst layer 64 disposed so as to face one of main surfaces of electrolyte film 62 (a first surface), and cathode catalyst layer 66 disposed so as to face the other main surface of electrolyte film 62 (a second surface).

Electrolyte film 62 has good ion conductivity in a wet state, and serves as an ion exchange membrane that allows protons to move between anode catalyst layer 64 and cathode catalyst layer 66. Electrolyte film 62 is formed of a solid polymer material such as fluorine-containing polymer or non-fluorine polymer. Examples of the material of electrolyte film 62 are similar to the materials presented for the first exemplary embodiment. Electrolyte film 62 has a thickness of, for example, 5 μm to 50 μm, inclusive.

Anode catalyst layer 64 and cathode catalyst layer 66 each include ion exchange resin and catalyst particles, and in some cases include carbon particles that support catalyst particles. The ion exchange resin included in anode catalyst layer 64 and cathode catalyst layer 66 connects the catalyst particles and electrolyte film 62 to transfer a proton between the catalyst particles and electrolyte film 62. The ion exchange resin may be formed of a polymer material similar to the polymer material of electrolyte film 62. Examples of the catalyst particles and the carbon particles are similar to the particles presented for the first exemplary embodiment. Anode catalyst layer 64 and cathode catalyst layer 66 each have a thickness of, for example, 1 μm to 100 μm, inclusive.

Anode gas diffusion layer 70 is disposed on anode catalyst layer 64 at a side opposite to electrolyte film 62. Anode gas diffusion layer 70 is formed from a composite of thermoplastic resin and conductive particles. The thermoplastic resin functions as a binder for binding conductive particles.

Thus, anode gas diffusion layer 70 has a structure in which the conductive particles are incorporated into a network formed from the thermoplastic resin. As a result, anode gas diffusion layer 70 is conductive and includes a large number of fine voids.

Anode gas diffusion layer 70 has anisotropic elasticity. In other words, anode gas diffusion layer 70 has a higher degree of elasticity in first direction X (a direction indicated by arrow X in FIG. 4), that is parallel to the main surface of the layer, than in second direction Y (a direction indicated by arrow Y in FIG. 4), that is parallel to the main surface and perpendicular to first direction X. For example, anode gas diffusion layer 70 is more likely to expand in first direction X parallel to the main surface and is less likely to expand in second direction Y perpendicular to first direction X. Anode gas diffusion layer 70 that is not pressed by separators 54a, 54b has a thickness of, for example, 150 μm to 550 μm, inclusive. Anode gas diffusion layer 70 that is pressed by separators 54a, 54b has a thickness of, for example, 100 μm to 500 μm, inclusive.

Examples of the conductive particles and the thermoplastic resin are similar to the materials presented for the first exemplary embodiment.

Anode gas diffusion layer 70 is primarily composed of the conductive particles and the thermoplastic resin. Preferably, anode gas diffusion layer 70 should contain 20 mass percent or less of conductive fibers each having a length of 30 μm or shorter. A content of the contained conductive fibers is less than a total content of the conductive particles and the thermoplastic resin, for example. Conductive fibers contained in anode gas diffusion layer 70 improve stiffness, conductivity, and gas diffusibility of anode gas diffusion layer 70. Examples of the conductive fibers are similar to the materials presented for the first exemplary embodiment. The length of each conductive fiber can be measured by a method similar to any of the methods presented for the first exemplary embodiment.

Fuel cell 51 includes fluid flow paths 72 that extend along the main surface of anode gas diffusion layer 70 from one end to the other end of the layer. Each of fluid flow paths 72 is a flow path where fuel gas supplied to anode gas diffusion layer 70 flows. According to the present exemplary embodiment, each of fluid flow paths 72 is a groove or a recess provided on main surface 70a of anode gas diffusion layer 70 facing separator 54a. Fluid flow paths 72 extend from the anode gas diffusion layer 70 end facing fuel supply manifold 160a to the other end facing fuel discharge manifold 160b. Fuel gas such as hydrogen gas is distributed to fluid flow paths 72 through fuel supply manifold 160a, and is supplied from fluid flow paths 72 to anode catalyst layer 64 of membrane electrode assembly 60 through anode gas diffusion layer 70. Fuel gas that has not reacted at anode catalyst layer 64 (fuel off-gas) is discharged from fuel discharge manifold 160b. Fluid flow paths 72 each extend so as to intersect with first direction X that is associated with the elasticity of anode gas diffusion layer 70. Fluid flow paths 72 each are disposed so as to be perpendicular to first direction X, for example. Second direction Y is a direction in which fluid flow paths 72 extend, fluid flow paths 72 allowing the flow of fuel gas which is to be supplied to anode gas diffusion layer 70. In other words, fluid flow paths 72 extend parallel to second direction Y.

Fluid flow paths 72 each have, for example, a depth of 30 μm to 450 μm, inclusive and a width of 100 μm to 1000 μm, inclusive. A distance between adjacent fluid flow paths 72 is from 100 μm to 1000 μm, inclusive. The number of fluid flow paths 72 is not particularly limited and may be set as appropriate in accordance with, for example, the dimensions of anode gas diffusion layer 70 and fluid flow paths 72. Main surface 70a of anode gas diffusion layer 70 includes at least one portion where no fluid flow path 72 is formed, and the portion comes into contact with separator 54a.

Cathode gas diffusion layer 90 is disposed on cathode catalyst layer 66 at a side opposite to electrolyte film 62. Cathode gas diffusion layer 90 is formed from a composite of thermoplastic resin and conductive particles. Thus, similarly to anode gas diffusion layer 70, cathode gas diffusion layer 90 is conductive and includes a large number of fine voids. Cathode gas diffusion layer 90 also has anisotropic elasticity. In other words, similarly to anode gas diffusion layer 70, cathode gas diffusion layer 90 has a higher degree of elasticity in first direction X, which is parallel to the main surface of the layer, than in second direction Y, which is parallel to the main surface and perpendicular to first direction X. For example, cathode gas diffusion layer 90 is more likely to expand in first direction X parallel to the main surface and is less likely to expand in second direction Y perpendicular to first direction X. Cathode gas diffusion layer 90 that is not pressed by separators 54a, 54b has a thickness of, for example, 150 μm to 550 μm, inclusive. Cathode gas diffusion layer 90 that is pressed by separators 54a, 54b has a thickness of, for example, 100 μm to 500 μm, inclusive.

Examples of the conductive particles and the thermoplastic resin contained in cathode gas diffusion layer 90 are identical to the examples illustrated for the conductive particles and the thermoplastic resin of anode gas diffusion layer 70. Cathode gas diffusion layer 90 is primarily composed of the conductive particles and the thermoplastic resin. Preferably, cathode gas diffusion layer 90 should contain 20 mass percent or less of conductive fibers each having a length of 30 μm or shorter. A content of the contained conductive fibers is less than a total content of the conductive particles and the thermoplastic resin, for example. Conductive fibers contained in cathode gas diffusion layer 90 improve stiffness, conductivity, and gas diffusibility of cathode gas diffusion layer 90. Examples of the conductive fibers are identical to the examples illustrated for the conductive fibers contained in anode gas diffusion layer 70. Any of the methods described above is used to measure the length of each conductive fiber contained in the layer.

Fuel cell 51 includes fluid flow paths 92 that extend along the main surface of cathode gas diffusion layer 90 from one end to the other end of the layer. Oxidant gas flows along fluid flow paths 92 and is supplied to cathode gas diffusion layer 90. Each of fluid flow paths 92 is a groove or a recess provided on main surface 90a of cathode gas diffusion layer 90 facing separator 54b. Fluid flow paths 92 extend from the cathode gas diffusion layer 90 end facing oxidant supply manifold 170a to the other end facing oxidant discharge manifold 170b. Oxidant gas such as air is distributed to fluid flow paths 92 through oxidant supply manifold 170a, and is supplied from fluid flow paths 92 to cathode catalyst layer 66 of membrane electrode assembly 60 through cathode gas diffusion layer 90. Fluid flow paths 92 each also serve as a drainage path for water generated in cathode catalyst layer 66. Oxidant gas that has not reacted at cathode catalyst layer 66 (oxidant off-gas) is discharged from oxidant discharge manifold 170b. Fluid flow paths 92 extend so as to intersect with first direction X that is associated with the elasticity of cathode gas diffusion layer 90. Fluid flow path 92 is disposed so as to be perpendicular to first direction X, for example. In other words, fluid flow paths 92 extend parallel to second direction Y.

A dimension of each of fluid flow paths 92 and a number of the paths are similar to the dimension and the number of fluid flow paths 72 of anode gas diffusion layer 70. Main surface 90a of cathode gas diffusion layer 90 includes at least one portion where no fluid flow path 92 is formed, and the portion comes into contact with separator 54b.

In some cases, a stacked structure of anode catalyst layer 64 and anode gas diffusion layer 70 is referred to as an anode, and a stacked structure of cathode catalyst layer 66 and cathode gas diffusion layer 90 is referred to as a cathode.

Frame 56 is disposed between separators 54a, 54b and surrounds a periphery of laminate 52. Thus, laminate 52 is accommodated in a space defined by separators 54a, 54b and frame 56. Frame 56 has fuel supply manifold 160a, oxidant discharge manifold 170b, and coolant manifold 180 on a first end and fuel discharge manifold 160b, oxidant supply manifold 170a, and coolant manifold 180 on a second end opposed to the first end.

According to this exemplary embodiment, frame 56 has a groove formed on surface 56c opposed to laminate 52 across the frame 56, and an end of electrolyte film 62 is inserted into the groove. The end of electrolyte film 62 which is inserted into the groove of frame 56 is a region other than a region that comes into contact with fuel supply manifold 160a, fuel discharge manifold 160b, oxidant supply manifold 170a, and oxidant discharge manifold 170b provided on frame 56. Frame 56 of clamped fuel cell 51 is in contact with side surface 70b that joins the one main surface to the other main surface of anode gas diffusion layer 70. Side surface 70b is parallel to a direction in which fluid flow paths 72 extend. Frame 56 of clamped fuel cell 51 is in contact with side surface 90b that joins the one main surface to the other main surface of cathode gas diffusion layer 90. Side surface 90b is parallel to a direction in which fluid flow paths 92 extend. Frame 56 of fuel cell 51 that is not clamped is separated from side surfaces 70b, 90b.

Frame 56 is formed from thermosetting resin. Examples of the thermosetting resin include epoxy resin and polyphenylene-sulfide (PPS) resin. Frame 56 has a thickness of, for example, 207 μm to 1250 μm, inclusive.

A first main surface of separator 54a comes into contact with main surface 70a of anode gas diffusion layer 70. Separator 54a has coolant flow paths 55a on a second main surface, i.e. a main surface at a side opposite to laminate 52, in order to cool laminate 52. A first main surface of separator 54b comes into contact with main surface 90a of cathode gas diffusion layer 90. Separator 54b has coolant flow paths 55b on a second main surface, i.e. a main surface at a side opposite to laminate 52, in order to cool laminate 52. Coolant flow paths 55a, 55b communicate with coolant manifold 180. Separators 54a, 54b are each formed from stainless steel, titanium, or carbon, for example. Separators 54a, 54b each have a thickness of, for example, 50 μm to 300 μm, inclusive.

With reference to FIG. 5B, separators 54a, 54b are disposed such that laminate 52 is interposed between the separators. A predetermined load put on the pair of fastening plates 130 (see FIG. 3) causes separators 54a, 54b to move toward a direction in which separators 54a, 54b get closer to each other. With reference to FIG. 5A, separator 54a presses laminate 52 with a predetermined pressure and stops when separator 54a facing surface 56a of frame 56 comes into contact with surface 56a. Separator 54b presses laminate 52 with a predetermined pressure and stops when separator 54b facing surface 56b of frame 56 comes into contact with surface 56b.

Anode gas diffusion layer 70 includes protrusions 74 that protrude toward separator 54a beyond a level of surface 56a of frame 56 facing surface 56a facing separator 54a while a predetermined pressure is not applied from separators 54a, 54b to laminate 52. Cathode gas diffusion layer 90 includes protrusions 94 that protrude toward separator 54b beyond a level of surface 56b of frame 56 facing surface 56b while a predetermined pressure is not applied from separators 54a, 54b to laminate 52. As a result, a predetermined pressure applied from separators 54a, 54b to laminate 52 causes separator 54a to press protrusions 74 and separator 54b to press protrusions 94. In other words, protrusions 74, 94 are pressed by separators 54a, 54b, and anode gas diffusion layer 70 and cathode gas diffusion layer 90 are deformed and put into contact with frame 56, while laminate 52 is clamped between separators 54a, 54b under a predetermined pressure.

As described above, anode gas diffusion layer 70 and cathode gas diffusion layer 90 each have a structure in which conductive particles are incorporated into a network of the thermoplastic resin. Meanwhile, frame 56 is formed from thermosetting resin. Thus, anode gas diffusion layer 70 and cathode gas diffusion layer 90 have lower stiffness than stiffness of frame 56. Moreover, anode gas diffusion layer 70 and cathode gas diffusion layer 90 each have a higher degree of elasticity in first direction X than in second direction Y, while first direction X intersects with an extension direction of fluid flow paths 72, 92. Consequently, if protrusions 74, 94 are pressed, anode gas diffusion layer 70 and cathode gas diffusion layer 90 are deformed so as to expand in a direction that intersects with a circulation direction of fuel gas and oxidant gas. Thus, side surfaces 70b, 90b of anode gas diffusion layer 70 and cathode gas diffusion layer 90 are put into contact with an inner face of frame 56, i.e. surface 56c.

Anode gas diffusion layer 70 is deformed such that a part of anode gas diffusion layer 70 near a joint part between separator 54a and frame 56 is deformed to follow the shape of the joint part. Likewise, a part of anode gas diffusion layer 70 near a joint part between frame 56 and electrolyte film 62 is deformed so as to follow the shape of the joint part. Cathode gas diffusion layer 90 is deformed such that a part of cathode gas diffusion layer 90 near a joint part between separator 54b and frame 56 is deformed to follow the shape of the joint part. Likewise, a part of cathode gas diffusion layer 90 near a joint part between frame 56 and electrolyte film 62 is deformed so as to follow the shape of the joint part. After laminate 52 is clamped between separators 54a, 54b, that is, anode gas diffusion layer 70 and cathode gas diffusion layer 90 are deformed, total thickness X of laminate 52 and separators 54a, 54b is, for example, from 0.5 mm to 1.5 mm, inclusive.

Even when anode catalyst layer 64 and cathode catalyst layer 66 are partially exposed before deformation of anode gas diffusion layer 70 and cathode gas diffusion layer 90, deformation of the two gas diffusion layers makes the exposed parts to be covered with the gas diffusion layers. This configuration enables an increase in the area of the catalyst layers that help fuel cell 51 to generate power and thus enables an increase in the effective power generation area of fuel cell 51. This configuration also suppresses cross leakage at the exposed parts of the catalyst layers.

In fuel cell 51 according to the present exemplary embodiment, anode gas diffusion layer 70 and cathode gas diffusion layer 90 serve as a sealing material. In other words, in this exemplary embodiment, frame 56 having high stiffness is provided around the periphery of laminate 52. Further, protrusions 74, 94 are pressed and deformed by separators 54*a*, 54*b*. As a result, anode gas diffusion layer 70 and cathode gas diffusion layer 90 are deformed so as to follow the shapes of the joint parts between separators 54*a*, 54*b* and frame 56, as well as between electrolyte film 62 and frame 56 and to come into contact with frame 56. This configuration suppresses leakage of fuel gas and oxidant gas at a laminate 52 end that comes into contact with frame 56. For example, this configuration suppresses fuel gas or oxidant gas from passing through anode gas diffusion layer 70 or cathode gas diffusion layer 90 without going through fluid flow paths 72, 92.

Solid polymer fuel cell 51 described above undergoes reaction similar to that illustrated in the first exemplary embodiment and generates electrical power.

Fuel cell 51 is manufactured as follows, for example. FIGS. 6A to 6D and 7A to 7D are schematic cross-sectional views illustrating processes involved in a method for manufacturing a fuel cell according to the second exemplary embodiment.

Figure 6A:
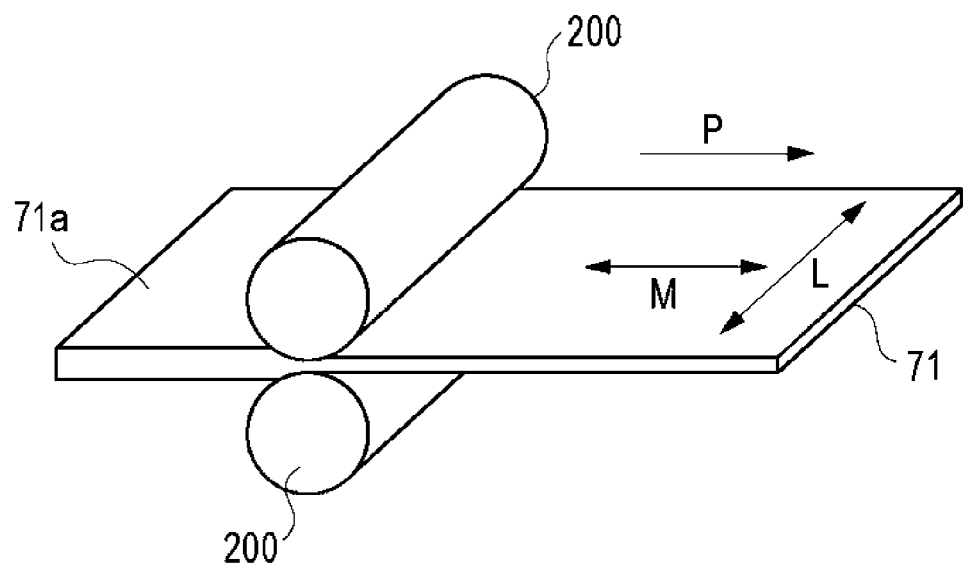
FIG. 6A is a schematic perspective view illustrating a method for manufacturing the fuel cell according to the second exemplary embodiment.

First, as illustrated in FIG. 6A, composite 71*a* of conductive particles and thermoplastic resin is rolled through rollers 200 to form porous sheet 71. Porous sheet 71 has anisotropic elasticity. In other words, porous sheet 71 has a higher degree of elasticity in direction L perpendicular to rolling direction P (a direction indicated by arrow P in FIG. 6A) than in direction M parallel to rolling direction P.

Figure 6B:
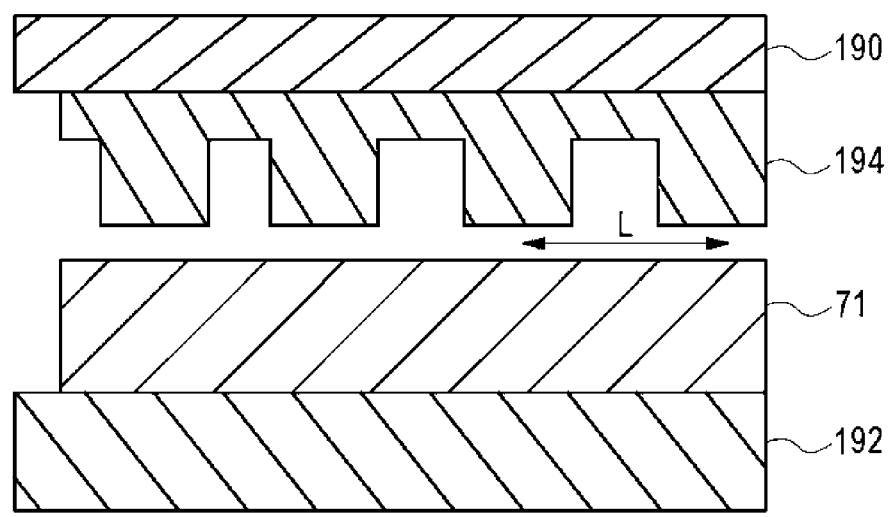
FIG. 6B is a schematic cross-sectional view illustrating a process involved in the method for manufacturing the fuel cell according to the second exemplary embodiment.

Subsequently, as illustrated in FIG. 6B, porous sheet 71 is disposed between first mold 190 and second mold 192. First mold 190 is provided with protrusions 194 corresponding to the shapes of fluid flow paths 72, 92. Second mold 192 facing protrusions 194 has a flat surface. Porous sheet 71 is disposed such that direction L for a high degree of elasticity is perpendicular to an extension direction of protrusions 194 while direction M for a low degree of elasticity is parallel to the extension direction of protrusions 194.

Figure 6C:
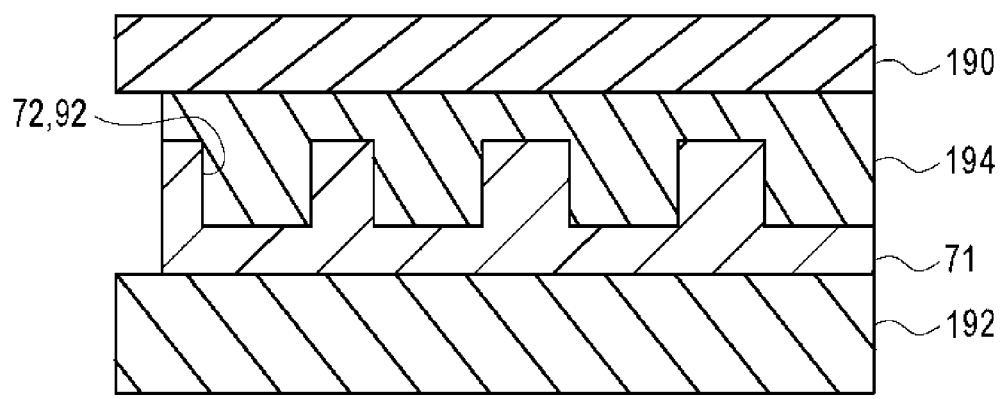
FIG. 6C is a schematic cross-sectional view illustrating another process involved in the method for manufacturing the fuel cell according to the second exemplary embodiment.

Subsequently, as illustrated in FIG. 6C, first mold 190 and second mold 192 are closed, and porous sheet 71 is heated and pressurized at a predetermined temperature and predetermined pressure. With this process, the thermoplastic resin in porous sheet 71 is plastically deformed, and thus groove-shaped fluid flow paths 72, 92 are formed on one main surface of porous sheet 71. The temperature and pressure at the molding are, for example, a normal temperature to 200° C., and 5 MPa to 50 MPa, respectively. After the elapse of a predetermined period of time, first mold 190 and second mold 192 are opened.

Figure 6D:
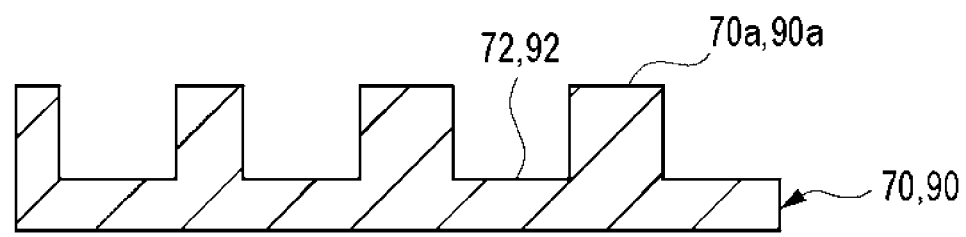
FIG. 6D is a schematic cross-sectional view illustrating another process involved in the method for manufacturing the fuel cell according to the second exemplary embodiment.

As illustrated in FIG. 6D, with the above-described processes, anode gas diffusion layer 70 having fluid flow paths 72 on one main surface, or cathode gas diffusion layer 90 having fluid flow paths 92 on one main surface are formed. In each of anode gas diffusion layer 70 and cathode gas diffusion layer 90, first direction X parallel to the main surface of the layer in FIG. 4 corresponds to direction L of porous sheet 71, whereas second direction Y parallel to the main surface and perpendicular to first direction X corresponds to direction M of porous sheet 71. As a result, anode gas diffusion layer 70 and cathode gas diffusion layer 90 each have a higher degree of elasticity in first direction X than in second direction Y. In the above-described processes, fluid flow paths 72 that extend so as to intersect with first direction X of anode gas diffusion layer 70 are provided, or fluid flow paths 92 that extend so as to intersect with first direction X of cathode gas diffusion layer 90 are provided.

Figure 7A:
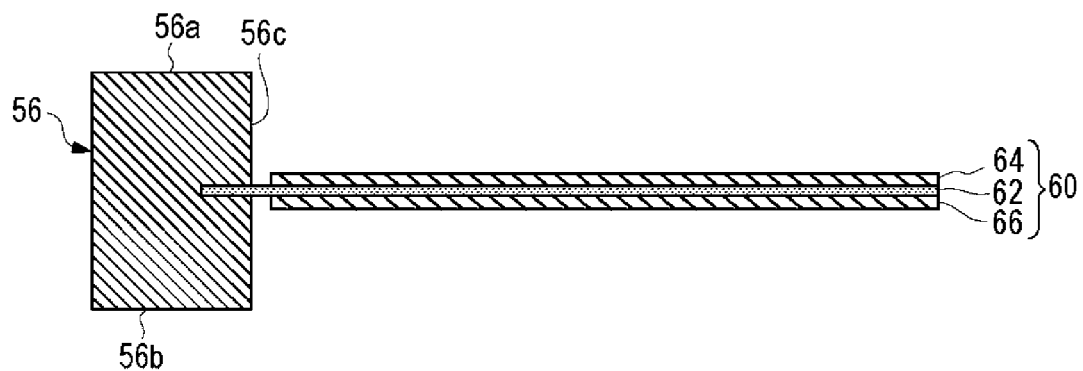
FIG. 7A is a schematic cross-sectional view illustrating another process involved in the method for manufacturing the fuel cell according to the second exemplary embodiment.

Subsequently, as illustrated in FIG. 7A, membrane electrode assembly 60 is prepared. Membrane electrode assembly 60 includes electrolyte film 62, anode catalyst layer 64 disposed so as to face one of main surfaces of electrolyte film 62, and cathode catalyst layer 66 disposed so as to face the other main surface of electrolyte film 62. Frame 56 is provided so as to surround a periphery of membrane electrode assembly 60.

Figure 7B:
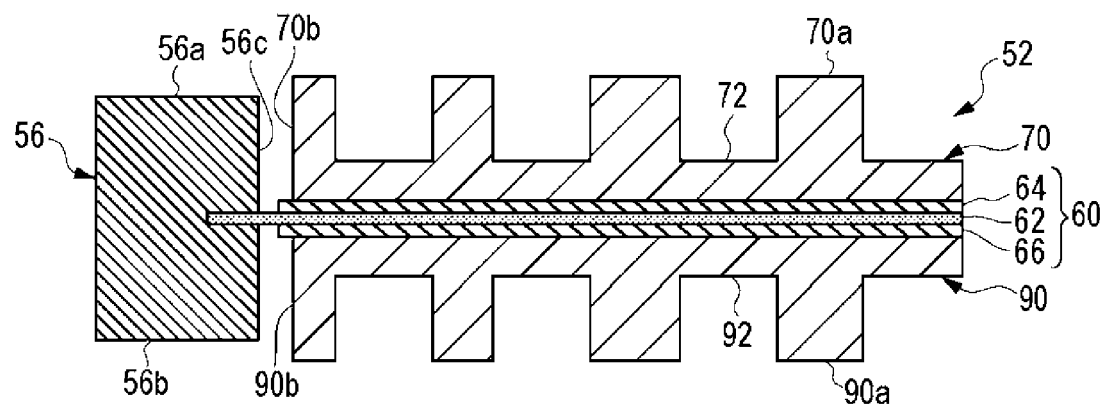
FIG. 7B is a schematic cross-sectional view illustrating another process involved in the method for manufacturing the fuel cell according to the second exemplary embodiment.
Figure 7C:
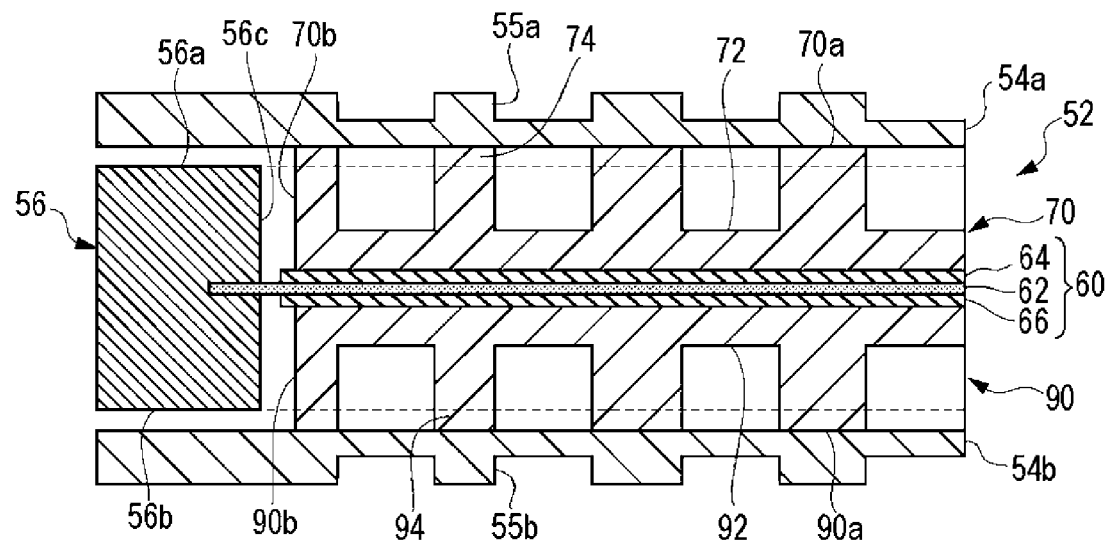
FIG. 7C is a schematic cross-sectional view illustrating another process involved in the method for manufacturing the fuel cell according to the second exemplary embodiment.

Subsequently, as illustrated in FIG. 7B, anode gas diffusion layer 70 is stacked on anode catalyst layer 64 at a side opposite to electrolyte film 62. Cathode gas diffusion layer 90 is stacked on cathode catalyst layer 66 at a side opposite to electrolyte film 62. This process provides a structure in which frame 56 surrounds a periphery of laminate 52 made up of membrane electrode assembly 60, anode gas diffusion layer 70, and cathode gas diffusion layer 90. Both side surface 70*b* of anode gas diffusion layer 70 and side surface 90*b* of cathode gas diffusion layer 90 oppose the inner face of frame 56, i.e. surface 56*c*. With reference to FIG. 7C, separator 54*a* is stacked on main surface 70*a*, i.e. the opposite side of anode gas diffusion layer 70 from membrane electrode assembly 60, and separator 54*b* is stacked on main surface 90*a*, i.e. the opposite side of cathode gas diffusion layer 90 from membrane electrode assembly 60.

Figure 7D:
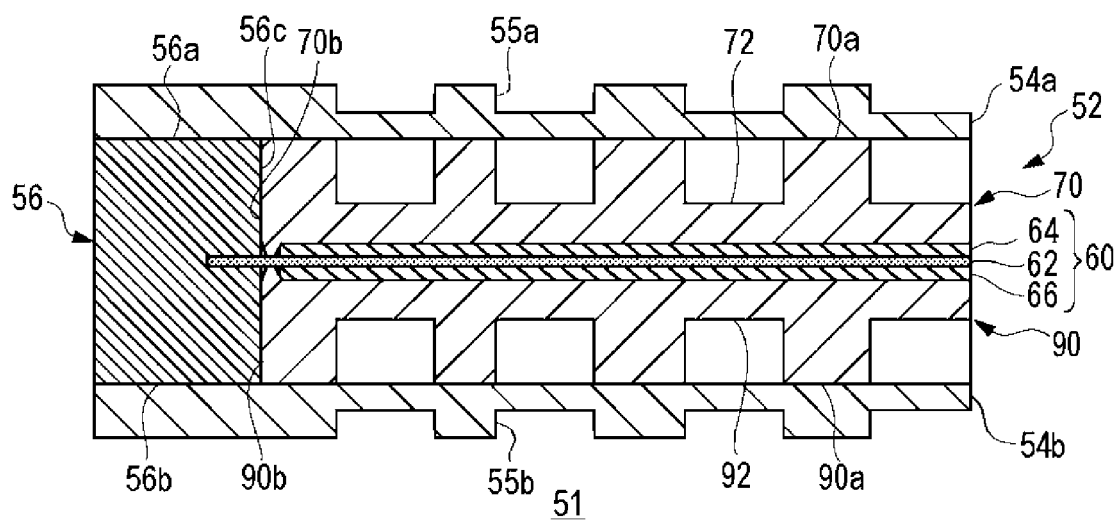
FIG. 7D is a schematic cross-sectional view illustrating another process involved in the method for manufacturing the fuel cell according to the second exemplary embodiment.

Subsequently, as illustrated in FIG. 7D, a predetermined pressure is applied to separators 54*a*, 54*b* to put laminate 52 between the separators and press protrusions 74, 94. This process causes anode gas diffusion layer 70 and cathode gas diffusion layer 90 to be deformed and put into contact with frame 56. Through the processes described above, fuel cell 51 is manufactured.

As described above, fuel cell 51 according to the present exemplary embodiment includes membrane electrode assembly 60, anode gas diffusion layer 70, cathode gas diffusion layer 90, separators 54*a*, 54*b*, fluid flow paths 72, 92, and frame 56. Anode gas diffusion layer 70 and cathode gas diffusion layer 90 each have a higher degree of elasticity in first direction X than in second direction Y, while first direction X extends in a direction that intersects with the extension direction of fluid flow paths 72, 92. Anode gas diffusion layer 70 and cathode gas diffusion layer 90 include protrusions 74, 94 that protrude toward separators 54*a*, 54*b* beyond the level of frame 56, respectively, while laminate 52 is not pressed by separators 54*a*, 54*b*.

Laminate 52 pressed by separators 54*a*, 54*b* causes protrusions 74, 94 to be pressed and thus anode gas diffusion layer 70 and cathode gas diffusion layer 90 to be deformed and put into contact with frame 56. As a result, gas leakage at the end of laminate 52 can be suppressed. This configuration enables a reduction in the amount of fuel gas and oxidant gas that do not contribute to electrode reaction, and thus enables degradation in fuel cell efficiency to be suppressed.

In this exemplary embodiment, anode gas diffusion layer 70 and cathode gas diffusion layer 90 are deformed and put into contact with frame 56 to ensure the gas sealing performance of fuel cell 51. This configuration enables fuel cell 51 to have a simplified gas sealing structure. This allows reductions in the number of components and costs for fuel cell 51. In this exemplary embodiment, anode gas diffusion layer 70 and cathode gas diffusion layer 90 each have anisotropic elasticity, and first direction X, which is higher in elasticity, intersects with the extension direction of fluid flow paths 72, 92. This configuration enables side surfaces 70*b*, 90*b* of anode gas diffusion layer 70 and cathode gas diffusion layer 90 to come into contact with frame 56 with increased reliability when protrusions 74, 94 have been pressed by separators 54*a*, 54*b*. As a result, fuel cell 51 can be provided with a simplified gas sealing structure while ensuring gas sealing performance.

Frame 56 is formed from thermosetting resin and thus has relatively high stiffness. This enables fuel cell 51 to achieve improved stiffness. Thus, fuel cell 51 can come down in thickness. Since anode gas diffusion layer 70 and cathode gas diffusion layer 90 are pressed and deformed by separators 54a, 54b, the area of contact between anode gas diffusion layer 70 and separator 54a, as well as the area of contact between cathode gas diffusion layer 90 and separator 54b can be secured with increased reliability. This configuration suppresses an increase in contact resistance between anode gas diffusion layer 70 and separator 54a, as well as in contact resistance between cathode gas diffusion layer 90 and separator 54b. This configuration also reduces dimensional accuracy required for frame 56 and other components that constitute fuel cell 51. Anode gas diffusion layer 70 and cathode gas diffusion layer 90 can follow to expansion or contraction of membrane electrode assembly 60 caused by heat or generated water.

Anode gas diffusion layer 70 has groove-shaped fluid flow paths 72 on main surface 70a that faces separators 54a, while cathode gas diffusion layer 90 has groove-shaped fluid flow paths 92 on main surface 90a that faces separators 54b. This configuration can increase the amount of deformation of anode gas diffusion layer 70 and cathode gas diffusion layer 90 when separators 54a, 54b press anode gas diffusion layer 70 and cathode gas diffusion layer 90. As a result, gas sealing performance of fuel cell 51 can be ensured with increased reliability.

In this exemplary embodiment, anode gas diffusion layer 70 and cathode gas diffusion layer 90 having anisotropic elasticity are formed by rolling. This simple method suffices to achieve fuel cell 51 ensuring gas sealing performance and having a simplified gas sealing structure.

Third Exemplary Embodiment

Figure 8:
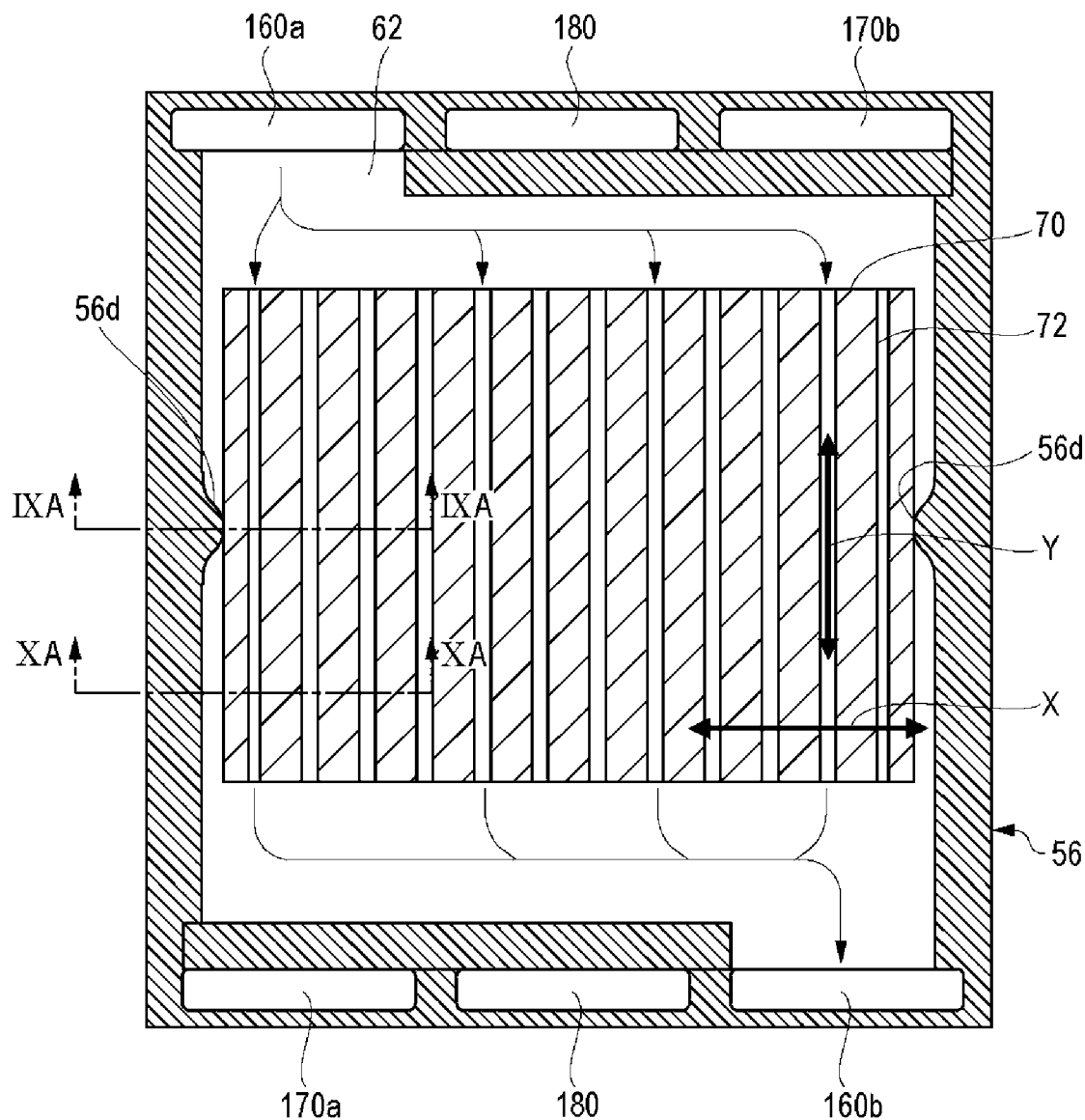
FIG. 8 is a plan view schematically illustrating a structure of a fuel cell according to a third exemplary embodiment.
Figure 9A:
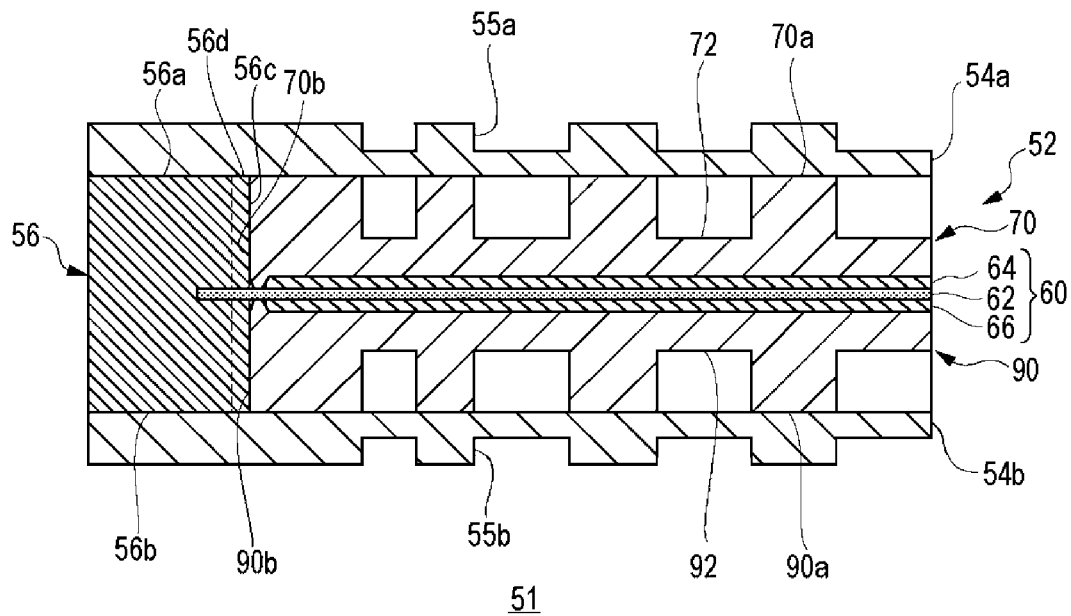
FIG. 9A is a cross-sectional view taken along line IXA-IXA of FIG. 8.
Figure 9B:
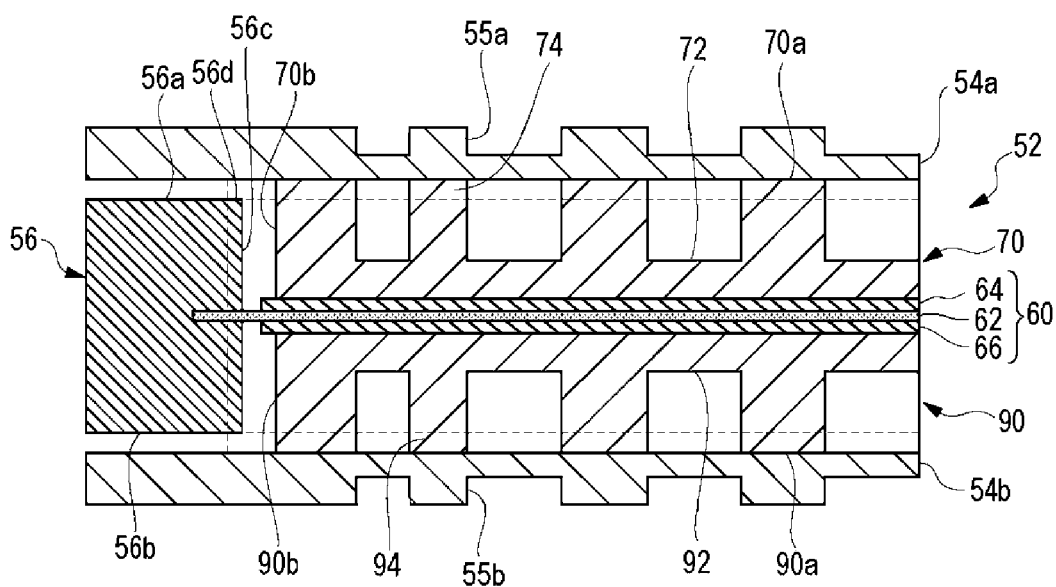
FIG. 9B is a cross-sectional view of a laminate of FIG. 9A before the laminate is clamped between a pair of separators.
Figure 10A:
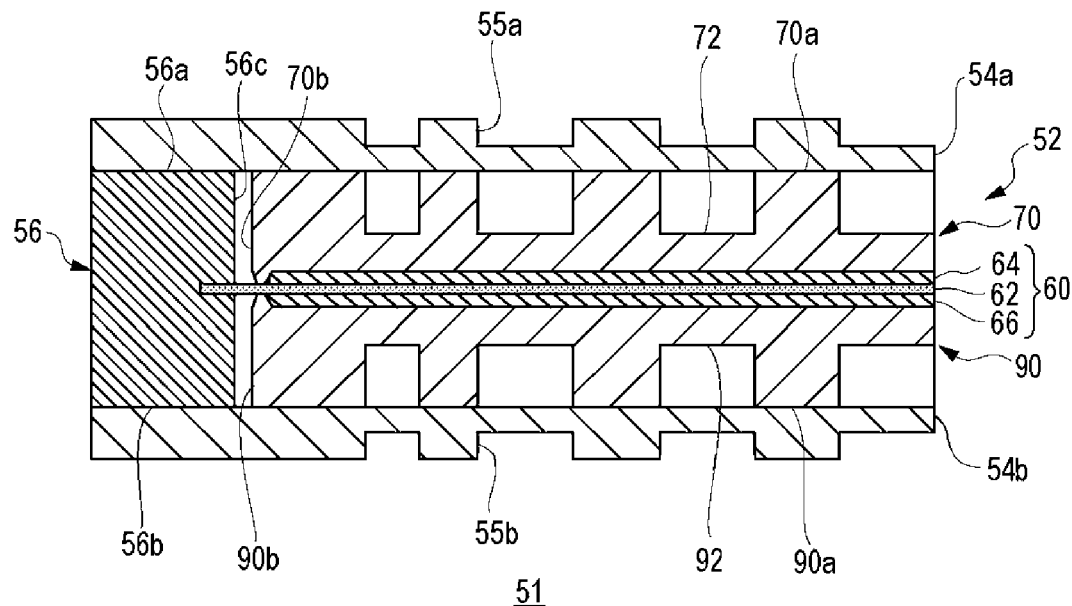
FIG. 10A is a cross-sectional view taken along line XA-XA of FIG. 8.
Figure 10B:
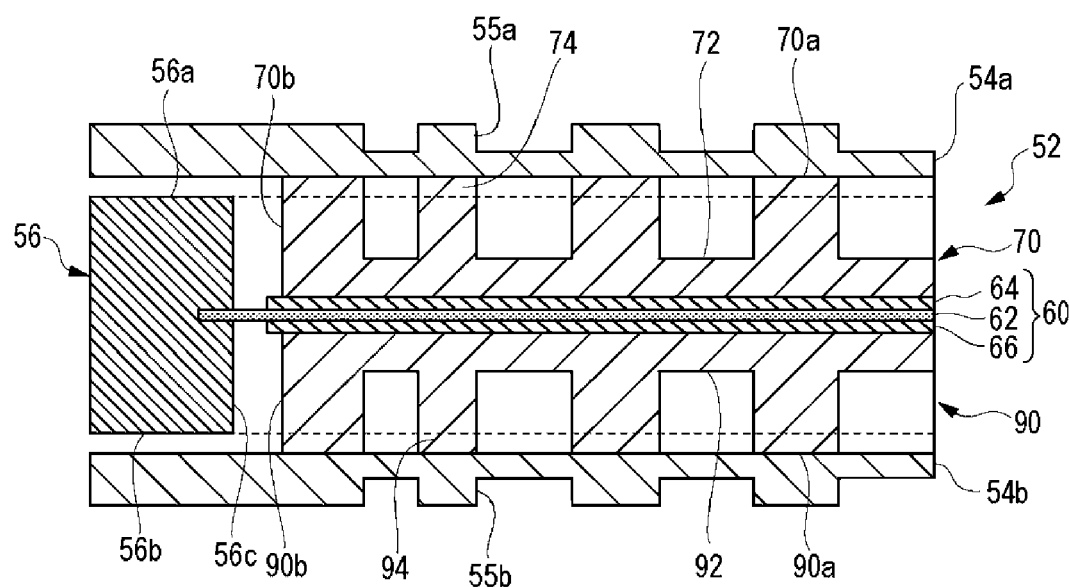
FIG. 10B is a cross-sectional view of a laminate of FIG. 10A before the laminate is clamped between a pair of separators.
Figure 11A:
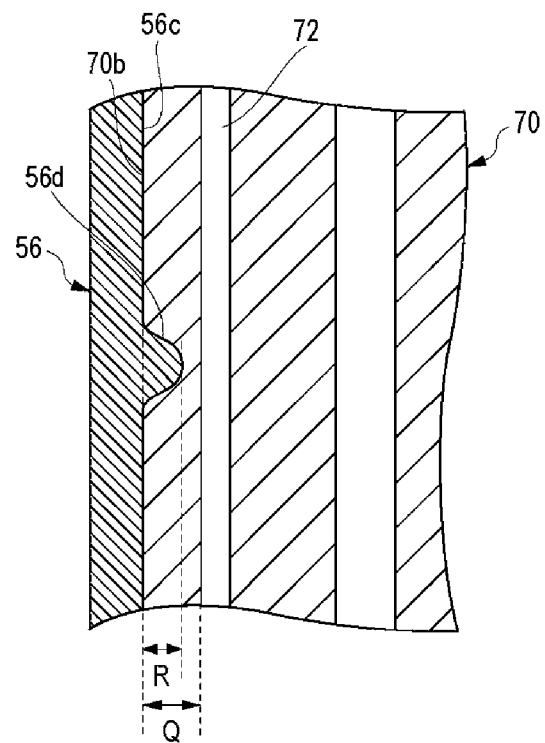
FIG. 11A is an enlarged plan view illustrating a region near a protrusion in FIG. 8.

FIG. 8 is a plan view schematically illustrating a structure of a fuel cell according to a third exemplary embodiment. FIG. 9A is a cross-sectional view taken along line IXA-IXA of FIG. 8. FIG. 10A is a cross-sectional view taken along line XA-XA of FIG. 8. FIG. 11A is an enlarged plan view illustrating a region near a protrusion in FIG. 8. FIG. 8 illustrates laminate 52 clamped between separators 54a, 54b, but the separators are omitted for the sake of describing the interior structure of fuel cell 51. FIG. 8 shows an example of surface on which anode gas diffusion layer 70 of fuel cell 51 is provided. FIGS. 9A, 10A, and 11A each illustrate laminate 52 clamped between separators 54a, 54b, whereas FIGS. 9B, 10B, and 11B each illustrate laminate 52 before laminate 52 is clamped between separators 54a, 54b.

Fuel cell 51 according to the third exemplary embodiment has an identical structure with fuel cell 51 according to the second exemplary embodiment except that frame 56 includes projecting portion 56d. The following description on fuel cell 51 according to the third exemplary embodiment is primarily given on discrepancies between the second and third exemplary embodiments, and redundant descriptions of identical elements are omitted or simplified.

In fuel cell 51 of this exemplary embodiment, similarly to the second exemplary embodiment, protrusions 74, 94 pressed by separators 54a, 54b cause anode gas diffusion layer 70 and cathode gas diffusion layer 90 to be deformed. In other words, with reference to FIGS. 9B and 10B, separators 54a, 54b are disposed such that laminate 52 is put between the separators. A predetermined load put on the pair of fastening plates 130 (see FIG. 3) causes separators 54a, 54b to move toward a direction in which separators 54a, 54b get closer to each other. With reference to FIGS. 9A and 10A, separators 54a, 54b press protrusions 74, 94 with a predetermined pressure, and thus anode gas diffusion layer 70 and cathode gas diffusion layer 90 are deformed so as to expand more in first direction X than in second direction Y.

Frame 56 incorporated in fuel cell 51 according to the present exemplary embodiment includes projecting portion 56d provided on surface 56c opposing anode gas diffusion layer 70 and cathode gas diffusion layer 90. Projecting portion 56d projects toward anode gas diffusion layer 70 and cathode gas diffusion layer 90. Thus, with reference to FIGS. 8 and 9A, at least projecting portion 56d of frame 56 comes into contact with anode gas diffusion layer 70 and cathode gas diffusion layer 90 while laminate 52 is clamped between separators 54a, 54b under a predetermined pressure. Consequently, projecting portion 56d provided on frame 56 enables frame 56 to come into contact with anode gas diffusion layer 70 and cathode gas diffusion layer 90 with increased reliability. This configuration suppresses gas leakage at an end of laminate 52 with increased reliability.

With reference to FIG. 10A, projecting portion 56d provided on frame 56 enables side surfaces 70b, 90b of anode gas diffusion layer 70 and cathode gas diffusion layer 90 to be kept apart from frame 56 except for a region that comes into contact with projecting portion 56d. This configuration suppresses the entry of anode gas diffusion layer 70 into a gap between frame 56 and separator 54a, as well as the entry of cathode gas diffusion layer 90 into a gap between frame 56 and separator 54b at the time of assembling fuel cell 51. As a result, the process of manufacturing fuel cell 51 can be simplified.

Figure 11B:
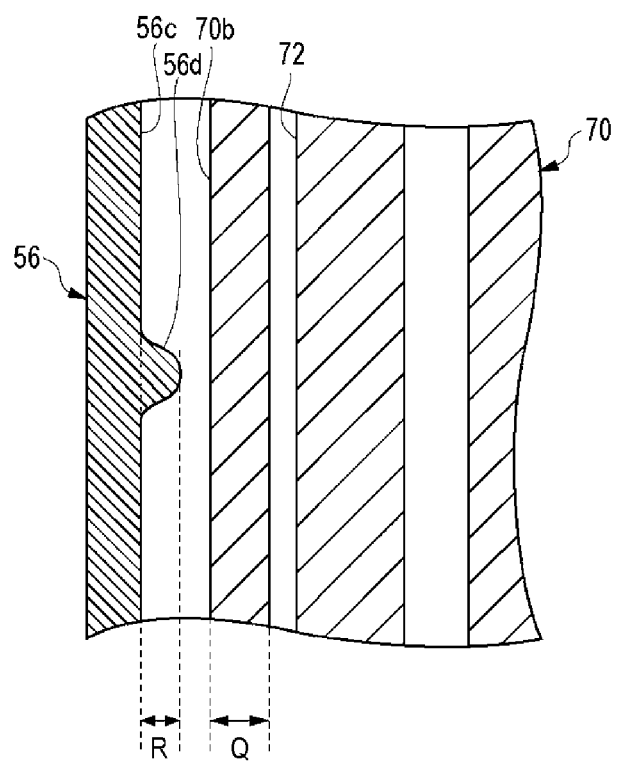
FIG. 11B is a plan view of a laminate of FIG. 11A before the laminate is clamped between a pair of separators.

With reference to FIGS. 11A and 11B, anode gas diffusion layer 70 is provided with fluid flow paths 72 such that distance Q between side surface 70b, which faces surface 56c of frame 56 provided with projecting portion 56d, and fluid flow path 72, which is nearest from side surface 70b, is longer than projection length R of projecting portion 56d. Likewise, cathode gas diffusion layer 90 is provided with fluid flow paths 92 such that a distance between side surface 90b and fluid flow path 92, which is nearest from side surface 90b, is longer than projection length R. This configuration hinders projecting portion 56d from reaching fluid flow paths 72, 92 nearest frame 56 with increased reliability even if side surfaces 70b, 90b of anode gas diffusion layer 70 and cathode gas diffusion layer 90 have advanced beyond a location of contact with projecting portion 56d toward frame 56 and projecting portion 56d has subsided into anode gas diffusion layer 70 and cathode gas diffusion layer 90. This prevents fluid flow paths 72, 92 nearest frame 56 from being blocked with projecting portion 56d. Thus, degradation in power generation efficiency of fuel cell 51 can be suppressed.

Fourth Exemplary Embodiment

Figure 12A:
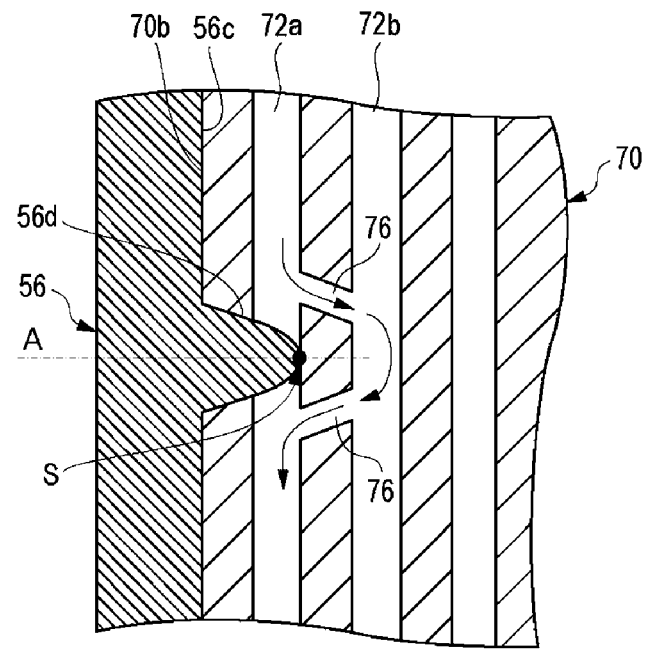
FIG. 12A is an enlarged plan view illustrating a region near a projecting portion of a fuel cell according to a fourth exemplary embodiment.
Figure 12B:
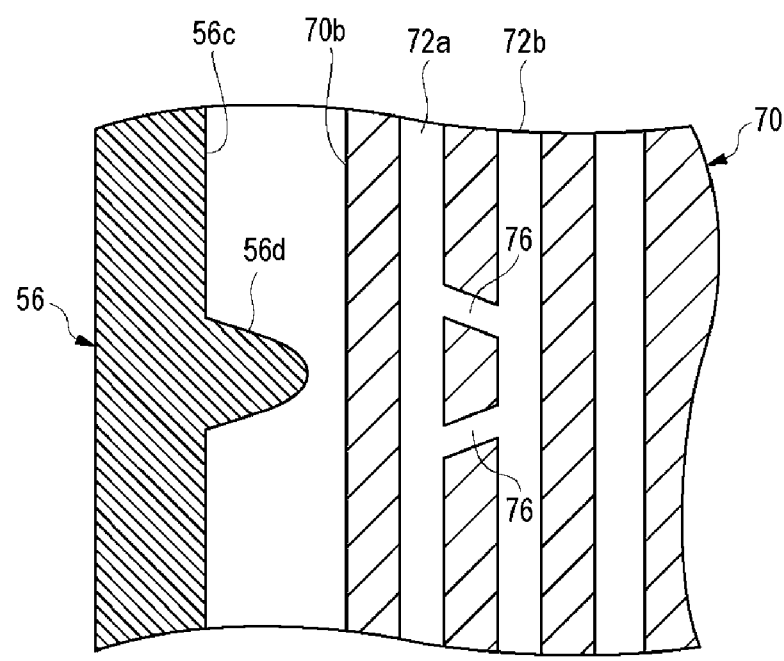
FIG. 12B is a plan view of a laminate of FIG. 12A before the laminate is clamped between a pair of separators.

FIGS. 12A and 12B are each an enlarged plan view illustrating a region near a projecting portion of a fuel cell according to a fourth exemplary embodiment. FIGS. 12A and 12B each illustrate an example of a surface on which anode gas diffusion layer 70 of fuel cell 51 is provided.

Fuel cell 51 according to the fourth exemplary embodiment has an identical structure with fuel cell 51 according to the second exemplary embodiment except that frame 56 includes projecting portion 56d, and anode gas diffusion layer 70 and cathode gas diffusion layer 90 each include connection flow paths 76. The following description on fuel cell 51 according to the fourth exemplary embodiment is primarily given on discrepancies between the second and fourth exemplary embodiments, and redundant descriptions of identical elements are omitted or simplified.

Frame 56 incorporated in fuel cell 51 according to the present exemplary embodiment includes projecting portion 56d provided on surface 56c opposing anode gas diffusion layer 70 and cathode gas diffusion layer 90. Projecting portion 56d projects toward anode gas diffusion layer 70 and cathode gas diffusion layer 90. Anode gas diffusion layer 70 includes connection flow paths 76 for connecting first fluid flow path 72a nearest frame 56 with second fluid flow path 72b next to first fluid flow path 72a. Likewise, cathode gas diffusion layer 90 includes connection flow paths for connecting a first fluid flow path nearest from side surface 90b with a second fluid flow path next to the first fluid flow path.

In fuel cell 51 of this exemplary embodiment, similarly to the third exemplary embodiment, protrusions 74 and protrusions 94 pressed by separators 54a, 54b cause anode gas diffusion layer 70 and cathode gas diffusion layer 90 to be deformed. Thus, at least projecting portion 56d comes into contact with side surface 70b of anode gas diffusion layer 70 and side surface 90b of cathode gas diffusion layer 90. This configuration suppresses gas leakage at an end of laminate 52 with increased reliability.

With reference to FIG. 12A, deformation of anode gas diffusion layer 70 and cathode gas diffusion layer 90 can cause projecting portion 56d to subside into anode gas diffusion layer 70 and cathode gas diffusion layer 90. In order to solve this problem, anode gas diffusion layer 70 according to the present exemplary embodiment includes connection flow paths 76 disposed on upstream side and downstream side in a direction of gas flowing along first fluid flow path 72a with respect to position S of intersection between first fluid flow path 72a and projecting portion 56d subsiding into anode gas diffusion layer 70.

In other words, first connection flow path 76 connects a part of first fluid flow path 72a on an upstream side of position S of subsiding projecting portion 56d with second fluid flow path 72b. Preferably, a connection between first connection flow path 76 and second fluid flow path 72b should be located on a downstream side of a connection between first fluid flow path 72a and first connection flow path 76. Second connection flow paths 76 connects second fluid flow path 72b with a part of first fluid flow path 72a on a downstream side of position S of subsiding projecting portion 56d. Preferably, a connection between second connection flow paths 76 and second fluid flow path 72b should be located on an upstream side of a connection between first fluid flow path 72a and second connection flow path 76 and on a downstream side of the connection between first connection flow path 76 and second fluid flow path 72b.

Thus, fuel gas flowing along first fluid flow path 72a flows from first fluid flow path 72a into second fluid flow path 72b via first connection flow path 76 and flows into first fluid flow path 72a again via second connection flow path 76. This configuration allows fuel gas flowing along first fluid flow path 72a to detour around projecting portion 56d and flow into the part of first fluid flow path 72a on a downstream side of position S of subsiding projecting portion 56d. Thus, degradation in power generation efficiency of fuel cell 51 can be suppressed.

Position S of intersection of first fluid flow path 72a and projecting portion 56d is a point where virtual line A passing through a tip of projecting portion 56d and intersecting perpendicular to an extension direction of first fluid flow path 72a meets a side wall of first fluid flow path 72a closer to second fluid flow path 72b, for example. Cathode gas diffusion layer 90 as well includes connection flow paths that are disposed similarly to the paths for anode gas diffusion layer 70 and produce similar effects.

The scope of the present disclosure is not limited to the exemplary embodiments described above, and includes modifications and variations since those skilled in the art can add various design changes to the exemplary embodiments.

In the exemplary embodiments described above, fuel cell stack 101 includes a plurality of stacked fuel cells 51. However, fuel cell stack 101 may include only one fuel cell 51. In the exemplary embodiments described above, anode gas diffusion layer 70 and cathode gas diffusion layer 90 each have anisotropic elasticity and include respective protrusions 74, 94. The anode gas diffusion layer 70 and cathode gas diffusion layer 90 are pressed by separators 54a, 54b respectively and deformed. However, a configuration of these elements is not particularly limited to the exemplary embodiments. Only one of anode gas diffusion layer 70 and cathode gas diffusion layer 90 may have anisotropic elasticity and include a protrusion, and may be pressed by a separator and be deformed. In this case, the other gas diffusion layer may be provided with a conventionally-known gas sealing structure.

In the exemplary embodiments described above, projecting portion 56d comes into contact with both anode gas diffusion layer 70 and cathode gas diffusion layer 90. However, a configuration of these elements is not particularly limited to the exemplary embodiments. Projecting portion 56d may come into contact with only one of the gas diffusion layers. In this case, the other gas diffusion layer may be provided with a conventionally-known gas sealing structure. No limitation is placed on an installation location of projecting portion 56d and the number of installed projecting portions 56d. In the exemplary embodiments described above, a distance from side surfaces 70b, 90b of the gas diffusion layers facing frame 56 to fluid flow paths 72, 92 nearest frame 56 may be longer than a distance between adjacent fluid flow paths 72, 92. This configuration prevents fluid flow paths 72, 92 nearest frame 56 from being deformed when anode gas diffusion layer 70 and cathode gas diffusion layer 90 have come into contact with frame 56.

In the exemplary embodiments described above, anode gas diffusion layer 70 and cathode gas diffusion layer 90 have respective groove-shaped fluid flow paths 72, 92 on main surfaces 70a, 90a of the gas diffusion layers. However, a configuration of these elements is not particularly limited to the exemplary embodiments. Only one of anode gas diffusion layer 70 and cathode gas diffusion layer 90 may have a groove-shaped fluid path on its main surface. In this case, the other gas diffusion layer may be provided with a conventionally-known fluid flow path, such as a fluid flow path made up of a groove on a separator. In the exemplary embodiments described above, anode gas diffusion layer 70 and cathode gas diffusion layer 90 each contain conductive fibers. However, a configuration of these elements is not particularly limited to the exemplary embodiments. Only one of anode gas diffusion layer 70 and cathode gas diffusion layer 90 may contain conductive fibers.

A fuel cell of the present disclosure has satisfactory gas sealing performance even if the fuel cell comes down in thickness, and can be put to a wide variety of uses such as in-vehicle power sources and power sources for mobile devices.

What is claimed is:
1. A fuel cell comprising:
a membrane electrode assembly including an electrolyte film having a first surface and a second surface disposed at a side opposite to the first surface,
an anode catalyst layer disposed so as to face the first surface of the electrolyte film, and
a cathode catalyst layer disposed so as to face the second surface of the electrolyte film;
an anode gas diffusion layer disposed on the anode catalyst layer at a side opposite to the electrolyte film;
a cathode gas diffusion layer disposed on the cathode catalyst layer at a side opposite to the electrolyte film;
a fuel gas fluid flow path for flowing fuel gas which is to be supplied to the anode gas diffusion layer; and
an oxidant gas fluid flow path for flowing oxidant gas which is to be supplied to the cathode gas diffusion layer;
a pair of separators disposed on the anode gas diffusion layer at a side opposite to the membrane electrode assembly and on the cathode gas diffusion layer at a side opposite to the membrane electrode assembly, respectively, the pair of separators being configured to clamp a laminate that includes the membrane electrode assembly, the anode gas diffusion layer, and the cathode gas diffusion layer; and
a frame disposed between the pair of separators and surrounding a periphery of the laminate, wherein:
at least one gas diffusion layer among the anode gas diffusion layer and the cathode gas diffusion layer has stiffness lower than stiffness of the frame and has a groove-shaped fluid flow path on a surface facing one of the pair of separators, the at least one gas diffusion layer having a protrusion protruding beyond a level of a surface of the frame which faces the one of the pair of separators in a state that the laminate is not clamped between the pair of separators under a pressure,
the protrusion is pressed by the one of the pair of separators so that the at least one gas diffusion layer is deformed and put into contact with the frame in a state that the laminate is clamped between the pair of separators under the pressure,
the at least one gas diffusion layer of the anode gas diffusion layer and the cathode gas diffusion layer has anisotropic elasticity,
the at least one gas diffusion layer of the anode gas diffusion layer and the cathode gas diffusion layer has a higher degree of elasticity in a first direction than in a second direction, the first direction being parallel to a main surface of the at least one gas diffusion layer which faces one of the pair of separators, and the second direction being parallel to the main surface and intersecting the first direction,
the second direction is an extension direction of a fluid flow path selected from the fuel gas fluid flow path and the oxidant gas fluid flow path, the fluid flow path flowing gas which is to be supplied to the at least one gas diffusion layer,
by the pair of separators clamping the laminate, the at least one gas diffusion layer expands to the first direction more than the second direction,
the pair of separators have coolant flow paths on a main surface at a side opposite to the anode gas diffusion layer and on a main surface at a side opposite to the cathode gas diffusion layer, respectively,
the coolant flow path on the main surface at the side opposite to the anode gas diffusion layer is coincidence with the groove-shaped fluid flow path which the anode gas diffusion layer has from the view outside the main surface at the side opposite to the anode gas diffusion layer, and
the coolant flow path on the main surface at the side opposite to the cathode gas diffusion layer is coincidence with the groove-shaped fluid flow path which the cathode gas diffusion layer has from the view outside the main surface at the side opposite to the cathode gas diffusion layer.

2. The fuel cell according to claim 1, wherein:
the frame is formed from thermosetting resin, and
the at least one gas diffusion layer is formed from a composite of thermoplastic resin and conductive particles.

3. The fuel cell according to claim 1, wherein a total thickness of the laminate and the pair of separators is from 0.5 mm to 1.5 mm, inclusive.

4. The fuel cell according to claim 1, wherein the at least one gas diffusion layer contains 30 mass percent or less of conductive fibers each having a length of 30 μm or shorter.

5. A fuel cell comprising:
a membrane electrode assembly including
an electrolyte film having a first surface and a second surface disposed at a side opposite to the first surface,
an anode catalyst layer disposed so as to face the first surface of the electrolyte film, and
a cathode catalyst layer disposed so as to face the second surface of the electrolyte film;
an anode gas diffusion layer disposed on the anode catalyst layer at a side opposite to the electrolyte film;
a cathode gas diffusion layer disposed on the cathode catalyst layer at a side opposite to the electrolyte film;
a pair of separators disposed on the anode gas diffusion layer at a side opposite to the membrane electrode assembly and on the cathode gas diffusion layer at a side opposite to the membrane electrode assembly, respectively, the pair of separators being configured to clamp a laminate that includes the membrane electrode assembly, the anode gas diffusion layer, and the cathode gas diffusion layer; and
a frame disposed between the pair of separators and surrounding a periphery of the laminate, wherein:
at least one gas diffusion layer among the anode gas diffusion layer and the cathode gas diffusion layer has stiffness lower than stiffness of the frame and has a groove-shaped fluid flow path on a surface facing one of the pair of separators, the at least one gas diffusion layer having a protrusion protruding beyond a level of a surface of the frame which faces the one of the pair of separators in a state that the laminate is not clamped between the pair of separators under a pressure,
the protrusion is pressed by the one of the pair of separators so that the at least one gas diffusion layer is deformed and put into contact with the frame in a state that the laminate is clamped between the pair of separators under the pressure,
the frame includes a projecting portion disposed on a surface facing the at least one gas diffusion layer,
the projecting portion is in contact with the at least one gas diffusion layer in a state that the laminate is clamped between the pair of separators under the pressure,
by the pair of separators clamping the laminate, the at least one gas diffusion layer expands in a direction toward the projecting portion more than in a direction parallel to a plane where the projecting portion is within and crossing the direction toward the projecting portion, and the at least one gas diffusion layer is in contact with the projecting portion, the pair of separators have coolant flow paths on a main surface at a side opposite to the anode gas diffusion layer and on a main surface at a side opposite to the cathode gas diffusion layer, respectively, the coolant flow path on the main surface at the side opposite to the anode gas diffusion layer is coincidence with the groove-shaped fluid flow path which the anode gas diffusion layer has from the view outside the main surface at the side opposite to the anode gas diffusion layer, and the coolant flow path on the main surface at the side opposite to the cathode gas diffusion layer is coincidence with the groove-shaped fluid flow path which the cathode gas diffusion layer has from the view outside the main surface at the side opposite to the cathode gas diffusion layer.

6. The fuel cell according to claim 5, wherein:
a distance between a surface of the at least one gas diffusion layer which faces the projecting portion of the frame and the fluid flow path which is nearest from the projecting portion is longer than a projection length of the projecting portion.

7. A fuel cell comprising:
a membrane electrode assembly including:
   an electrolyte film having a first surface and a second surface disposed at a side opposite to the first surface,
   an anode catalyst layer disposed so as to face the first surface of the electrolyte film, and
   a cathode catalyst layer disposed so as to face the second surface of the electrolyte film;
an anode gas diffusion layer disposed on the anode catalyst layer at a side opposite to the electrolyte film;
a cathode gas diffusion layer disposed on the cathode catalyst layer at a side opposite to the electrolyte film;
a pair of separators disposed on the anode gas diffusion layer at a side opposite to the membrane electrode assembly and on the cathode gas diffusion layer at a side opposite to the membrane electrode assembly, respectively, the pair of separators being configured to clamp a laminate that includes the membrane electrode assembly, the anode gas diffusion layer, and the cathode gas diffusion layer; and
a frame disposed between the pair of separators and surrounding a periphery of the laminate, wherein:

at least one gas diffusion layer among the anode gas diffusion layer and the cathode gas diffusion layer has stiffness lower than stiffness of the frame and has a protrusion protruding beyond a level of a surface of the frame which faces one of the pair of separators in a state that the laminate is not clamped between the pair of separators under a pressure, and the one of the pair of separators presses the protrusion and gets the at least one of the gas diffusion layers to be deformed and put into contact with the frame in a state that the laminate is clamped between the pair of separators under the pressure, the frame includes a projecting portion on a surface facing the at least one gas diffusion layer, and the projecting portion is in contact with the at least one of the gas diffusion layers in a state that the laminate is clamped between the pair of separators under the pressure, by the pair of separators clamping the laminate, the at least one gas diffusion layer expands in a direction toward the projecting portion more than in a direction parallel to a plane where the projecting portion is within and crossing the direction toward the projecting portion, and the at least one gas diffusion layer is in contact with the projecting portion, the pair of separators have coolant flow paths on a main surface at a side opposite to the anode gas diffusion layer and on a main surface at a side opposite to the cathode gas diffusion layer, respectively, the coolant flow path on the main surface at the side opposite to the anode gas diffusion layer is coincidence with the groove-shaped fluid flow path which the anode gas diffusion layer has from the view outside the main surface at the side opposite to the anode gas diffusion layer, and the coolant flow path on the main surface at the side opposite to the cathode gas diffusion layer is coincidence with the groove-shaped fluid flow path which the cathode gas diffusion layer has from the view outside the main surface at the side opposite to the cathode gas diffusion layer.

8. The fuel cell according to claim 7, wherein
a distance between a surface of the at least one gas diffusion layer which faces the projecting portion of the frame and the fluid flow path nearest the projecting portion is longer than a projection length of the projecting portion.

* * * * *